United States Patent [19]
Duffy

[11] Patent Number: 5,179,640
[45] Date of Patent: Jan. 12, 1993

[54] GENERATING REPEATING PATTERNS FROM A PATTERN HEADER

[75] Inventor: Christopher J. Duffy, Sunnyvale, Calif.

[73] Assignee: Oce Graphics USA Inc., Mountain View, Calif.

[21] Appl. No.: 473,644

[22] Filed: Feb. 1, 1990

[51] Int. Cl.$^5$ ............................................. G06F 15/62
[52] U.S. Cl. ..................................................... 395/132
[58] Field of Search ................ 364/518, 521; 340/793; 358/429, 457, 459; 395/132

[56] References Cited

U.S. PATENT DOCUMENTS

| | | | |
|---|---|---|---|
| 4,012,584 | 3/1977 | Gascoigne | 358/302 |
| 4,688,031 | 8/1987 | Haggerty | 340/793 |
| 4,703,318 | 10/1987 | Haggerty | 340/793 X |
| 4,827,352 | 5/1989 | Yoneda et al. | 358/457 |
| 4,903,142 | 2/1990 | Hasebe et al. | 358/457 |
| 4,937,677 | 6/1990 | van Dorsselaer | 358/457 X |

OTHER PUBLICATIONS

R. Ulichney, Digital Halftoning (1987), The MIT Press, Cambridge, Mass.; Title page and pp. 1-14.
J. Foley et al., Fundamentals of Interactive Computer Graphics, (1983), Addison Wesley Publishing; Title page and pp. 597-601.
DP8500 Raster Graphics Processor (1988), National Semiconductor Corporation; pp. 1-40.
HD63484 ACRTC Advanced CRT Controller User's Manual, Hitachi; Title page and pp. 113-114, 181-182, 271-273, 284-291.
S. Beale et al., "A Touch of Gray," MACUSER, Feb. 1989, pp. 257, 259-263, 265-267.
H. Eckstein, "Four-Color Fundamentals," PUBLISH!, May 1989, pp. 44-49.
K. Baumann et al., "The Full-Color Desktop," PUBLISH!, May 1989; pp. 50-59.
K. Baumann, "Do-It-Yourself Color Separations," PUBLISH!, May 1989; pp. 60-63.

Primary Examiner—Gary V. Harkcom
Assistant Examiner—Mark K. Zimmerman
Attorney, Agent, or Firm—Bruce D. Riter

[57] ABSTRACT

A set of pattern headers is used to replicate repeating patterns used in digitally-simulated halftone screens. The use of pattern headers is suited to digital processing systems which are most efficient when processing data having dimensions which are an integer power of two, yet permits generation of repeating patterns having dimensions which are other than an integer power of two. A complete repeating pattern is stored as a one-dimensional-array pattern header. The repeating pattern is generated from that pattern header by suitable shifting of the pattern header. The repeating pattern may be arbitrarily smaller than the pattern header and may, for example, comprise a binary bit pattern useful in driving a binary rendering device or a pattern of integer values representing tonal intensities of the digitally-simulated halftone screen useful in driving a variable-dot-size rendering device.

14 Claims, 15 Drawing Sheets

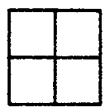 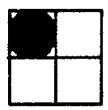 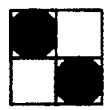  
LEVEL    0      1      2      3      4
FIG.1a
PRIOR ART
```
1  2  3  4  5
3  4  5  1  2
5  1  2  3  4
2  3  4  5  1
4  5  1  2  3
```
FIG.1b
PRIOR ART

| | | | | | | | | | | | |
|---|---|---|---|---|---|---|---|---|---|---|---|
| 4 | 10 | 5 | 9 | 11 | 7 | 12 | 1 | 2 | 6 | 13 | 8 | 3 |
| 2 | 6 | 13 | 8 | 3 | 4 | 10 | 5 | 9 | 11 | 7 | 12 | 1 |
| 9 | 11 | 7 | 12 | 1 | 2 | 6 | 13 | 8 | 3 | 4 | 10 | 5 |
| 8 | 3 | 4 | 10 | 5 | 9 | 11 | 7 | 12 | 1 | 2 | 6 | 13 |
| 12 | 1 | 2 | 6 | 13 | 8 | 3 | 4 | 10 | 5 | 9 | 11 | 7 |
| 10 | 5 | 9 | 11 | 7 | 12 | 1 | 2 | 6 | 13 | 8 | 3 | 4 |
| 6 | 13 | 8 | 3 | 4 | 10 | 5 | 9 | 11 | 7 | 12 | 1 | 2 |
| 11 | 7 | 12 | 1 | 2 | 6 | 13 | 8 | 3 | 4 | 10 | 5 | 9 |
| 3 | 4 | 10 | 5 | 9 | 11 | 7 | 12 | 1 | 2 | 6 | 13 | 8 |
| 1 | 2 | 6 | 13 | 8 | 3 | 4 | 10 | 5 | 9 | 11 | 7 | 12 |
| 5 | 9 | 11 | 7 | 12 | 1 | 2 | 6 | 13 | 8 | 3 | 4 | 10 |
| 13 | 8 | 3 | 4 | 10 | 5 | 9 | 11 | 7 | 12 | 1 | 2 | 6 |
| 7 | 12 | 1 | 2 | 6 | 13 | 8 | 3 | 4 | 10 | 5 | 9 | 11 |

FIG.1c

PRIOR ART

| | | | | | | | | | |
|---|---|---|---|---|---|---|---|---|---|
| 1 | 3 | 6 | 4 | 2 | 8 | 9 | 5 | 7 | 10 |
| 4 | 2 | 8 | 9 | 5 | 7 | 10 | 1 | 3 | 6 |
| 9 | 5 | 7 | 10 | 1 | 3 | 6 | 4 | 2 | 8 |
| 10 | 1 | 3 | 6 | 4 | 2 | 8 | 9 | 5 | 7 |
| 6 | 4 | 2 | 8 | 9 | 5 | 7 | 10 | 1 | 3 |
| 8 | 9 | 5 | 7 | 10 | 1 | 3 | 6 | 4 | 2 |
| 7 | 10 | 1 | 3 | 6 | 4 | 2 | 8 | 9 | 5 |
| 3 | 6 | 4 | 2 | 8 | 9 | 5 | 7 | 10 | 1 |
| 2 | 8 | 9 | 5 | 7 | 10 | 1 | 3 | 6 | 4 |
| 5 | 7 | 10 | 1 | 3 | 6 | 4 | 2 | 8 | 9 |

FIG.1d

PRIOR ART

FIG. 1e
PRIOR ART

|  | INTENSITY PATTERN | PATTERN HEADER |
|---|---|---|
| INTENSITY 1: | 1 0 0 0 0<br>0 0 0 1 0<br>0 1 0 0 0<br>0 0 0 0 1<br>0 0 1 0 0 | 1 0 0 0 0 1 0 0 |
| INTENSITY 2: | 1 1 0 0 0<br>0 0 0 1 1<br>0 1 1 0 0<br>1 0 0 0 1<br>0 0 1 1 0 | 1 1 0 0 0 1 1 0 |
| INTENSITY 3: | 1 1 1 0 0<br>1 0 0 1 1<br>0 1 1 1 0<br>1 1 0 0 1<br>0 0 1 1 1 | 1 1 1 0 0 1 1 1 |
| INTENSITY 4: | 1 1 1 1 0<br>1 1 0 1 1<br>0 1 1 1 1<br>1 1 1 0 1<br>1 0 1 1 1 | 1 1 1 1 0 1 1 1 |
| INTENSITY 5: | 1 1 1 1 1<br>1 1 1 1 1<br>1 1 1 1 1<br>1 1 1 1 1<br>1 1 1 1 1 | 1 1 1 1 1 1 1 1 |

PATTERN HEADER 14 13 6 5 7 21 22 23 19 4 1 3 16 24 25 20 8 2 9 10 18 15 11 12 17 14 13 6 5 7 21 22

EXAMPLE 1 (TO GENERATE ROW 1 OF FIGURE 7)
SV0 = 0; DIM = 25; SV = 7; SV1 = SV0 + SV = 7;

LEFT-SHIFTED  23 19 4 1 3 16 24 25 20 8 2 9 10 18 15 11 12 17 14 13 6 5 7 21 22
RIGHT-SHIFTED                                                        14 13 6 5 7 21 22 23 19 4 1 3 16 24

OR'ed 23 19 4 1 3 16 24 25 20 8 2 9 10 18 15 11 12 17 14 13 6 5 7 21 22 23 19 4 1 3 16 24

EXAMPLE 2 (TO GENERATE ROW 2 OF FIGURE 7)
SV1 = 7; DIM = 25; SV = 7; SV2 = SV1 + SV = 14;

LEFT-SHIFTED  25 20 8 2 9 10 18 15 11 12 17 14 13 6 5 7 21 22 23 19 4 1 3 16 24
RIGHT-SHIFTED                                                        14 13 6 5 7 21 22 23 19 4 1 3 16 24

OR'ed 25 20 8 2 9 10 18 15 11 12 17 14 13 6 5 7 21 22 23 19 4 1 3 16 24 25 20 8 2 9 10 18

EXAMPLE 3 (TO GENERATE ROW 3 OF FIGURE 7)
SV2 = 14; DIM = 25; SV = 7; SV3 = SV2 + SV = 21;

LEFT-SHIFTED  15 11 12 17 14 13 6 5 7 21 22 23 19 4 1 3 16 24 25 20 8 2 9 10 18
RIGHT-SHIFTED                                                        14 13 6 5 7 21 22 23 19 4 1 3 16 24 13 6

PATTERN HEADER abcdefghijabcdef

DIM = 10;  SV = 3;

abcdefghijabcdefghija
defghijabc
ghijabc (2112, 1739)

jabcdefghijabcdefghija
cdefghijabc
fghijabc

ET CETERA

TO MAP THE REPEATING PATTERN REPRESENTED BY ANY PATTERN HEADER TO ANY COORDINATE LOCATION (x,y), A SHIFT VALUE $SV_{xy}$ CAN EASILY BE CALCULATED.

$SV_{xy}$ = (x + (y * SV)) MODULO DIM;
$SV_{xy}$ = (2112 + (1739 * 3)) MODULO 10;
$SV_{xy}$ = 7329 MODULO 10;
$SV_{xy}$ = 9;

GENERATING REPEATING PATTERNS FROM A PATTERN HEADER

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates to computer-based image processing with digital halftoning, and more particularly to methods and apparatus for efficient storage and generation of digital halftoning screens by generating repeating patterns from a pattern header.

2. The Prior Art

The recent proliferation of computer-based image processing in the desk-top publishing and graphic arts industries has created a demand for output devices which accurately reproduce a wide variety of color images. Such images are typically represented as binary digital data generated and/or stored in a computer system and may originate from computer-aided drafting systems, digital scanning of photographic images, or other sources.

Many devices for rendering color patterns of digitized images are currently available in the marketplace and/or under development. Those used in the printing industry to produce "hard-copy" output employ such technologies as electrostatic (as in the Model G3048 Color Electrostatic Plotter available from Océ Graphics USA Inc. of Mountain View, Calif.), thermal transfer of ink from coated sheets (as in the Océ Graphics Model G5232 Color Thermal Plotter), dye thermal sublimation (DuPont 4CAST digital color imager), and ink jets (Hewlett-Packard Paintjet XL). Other color image rendering devices include cathode-ray tube display screens, liquid crystal display screens, apparatus for preparing images for computer memory storage (as in the Intel 82786 graphics coprocessor), and even apparatus for rendering woven or printed patterns in textiles. For purposes of the discussion herein, such devices will be referred to collectively as rendering devices, i.e., any device used to render an image from a digital description of the image. Typically, rendering devices produce the image by scanning in "raster" fashion.

Color rendering devices typically employ three or four "process" colors. The process colors may be primary colors (Red, Blue and Green) as in a cathode-ray tube display, or may be complementary colors (Cyan, Magenta, Yellow and Black) as in an Océ Graphics Model G5232 Color Thermal Plotter. The full-color image to be rendered may, for example, be represented as a set of process-color images made up of an arrangement of individual pixels (in the case of a cathode-ray tube display) or of individual dots or of spots made up of a pattern of individual dots (in the case of printers or plotters). The set of process-color images, when overlaid and properly registered, produce a full-color output image. When viewed from a distance, the process-color pixels or dots or spots which form the image are spatially integrated by the human eye to give the perception of a wide range of hue and intensity.

A dot-size modulation rendering device is one which produces variable-sized dots representing a certain number of levels of color intensity, each dot represented by, e.g., two or three digital bits. An example of a dot-size modulation rendering device is the Iris 3024 color ink jet printer with up to 31 different sized dots. A binary rendering device, one which produces either a full-sized dot or no dot at all, represents each dot by a single digital bit ("dot-on" and "dot-off"). The Océ Graphics Model G5232 Color Thermal Plotter is an example of a binary rendering device. With either type of device, the limited number of available intensity levels may be insufficient for rendering an image with the desired range of intensity levels.

It is known that an expanded range of available intensities may be approximated with graphic output devices by use of dot patterns. FIG. 1a shows a simple example using a 2×2 pattern of "on"/"off" dots to approximate five intensity levels. In general, an n×n group of binary dots can provide $n^2+1$ intensity levels. Spatial resolution may thus be sacrificed to obtain increased intensity resolution.

Until recently, color rendering devices intended for such applications as color output of computer graphics have concentrated on obtaining merely more colors, rather than on the consistent rendering of exact colors. While such devices may be acceptable for rendering line-drawings from computer-aided drafting systems and the like, they are generally unable to faithfully reproduce colors in more complex images (such as digitized photographic images).

Many color rendering devices in current use in desk-top publishing employ ordered dithering techniques for representing the output colors. One example of such a device is the Tektronix Phaser CPS color thermal printer. In general, ordered dithering techniques serve well to obtain a certain number of colors using three or four process colors, such as Green, Red and Blue, or Cyan, Magenta, Yellow and Black. Typically, a 5×5 square matrix of pixels or dots is used to approximate 25 intensities for any given color. But because sufficiently precise registration of the overlaid process color images is not always possible (such as when the process color images are sequentially applied to a sheet of paper), consistently accurate reproduction of color images is not assured. Even slight misalignment of the process-color images can result in moiré patterns and/or other perceptible deficiencies in the rendered image. An advantage of ordered dithering techniques, and perhaps a major reason for their widespread use, is that they are compatible with the hardware requirements of binary digital processors; that is, they can accommodate the need to replicate binary patterns whose sizes are compatible with the processor—typically 8-bit or 16-bit patterns.

Recent increased emphasis on accurate computer-based rendition of color images has led to interest in digital simulation of the halftoning techniques long used in the printing industry to obtain accurate colors in printing magazines, books, posters and the like. Digitally-simulated halftoning can overcome many of the problems inherent with ordered dithering techniques, and permit repeatable rendering of images with accurate color and intensity.

In the halftoning technique used in the printing industry, each tiny region of a monochrome image is imprinted with a circle of ink (e.g., black ink for black-and-white images) having an area proportional to the blackness (1-intensity) of the area in the original image.

Newspaper halftones may, for example, use a frequency of 60 to 80 lines per inch, while magazine and advertising halftones use up to 150 lines per inch.

In conventional color halftoning as used in the printing industry, images of four process colors are overlaid to render the full-color output image. Rendered-color areas are thereby formed of rosette-like regions of juxtaposed or partially overlapping process-color dots. Each of the process-color images may be viewed as being like a window screen having parallel rows of openings (dots) with a specified distance between each of the openings.

If any two of the process-color images are overlaid at a small acute angle (less than about 15 degrees) between the rows of openings, color rendition suffers and moiré patterns can appear in the rendered image with even slight misalignment of the process-color images. Therefore, in conventional color halftoning, the screens representing the individual process colors are rotated relative to one another at carefully-selected angles. That is, a first process-color image (for example, yellow) is printed, its screen orientation being at a reference angle such as 90 degrees relative to the image to be rendered. Then a second process-color image (for example, Magenta) is printed, its screen rotated at an angle such as 75 degrees from the reference angle. Then a third process-color image (for example, Cyan) is printed, its screen rotated at an angle such as 105 degrees from the reference angle. Finally the fourth process-color image (for example, Black) is printed, its screen rotated at an angle such as 45 degrees from the reference angle. Rotating screens at suitable angles offers independence from color drifting problems caused by slight errors in registration of the process-color images. Selection of the best angles to use for a given process or rendering device is generally a matter of experimentation.

The process of rendering continuous-tone images on a computer-based rendering device is referred to as digital halftoning. The goal is to generate the appearance of continuous toning by carefully defining the arrangement of pixels or dots. For any given digital halftone, there is some fixed number of tonal intensities, each of which is a pattern of pixels or dots. The pixels or dots of the pattern may be either binary or variable-sized, depending upon the capabilities of the particular rendering device. For multiple-color printers, a digital halftone image is generated for each process color. Further information about digital halftoning may be found in R. Ulichney, Digital Halftoning (1987), The MIT Press, Cambridge, Mass., the content of which is incorporated herein for all purposes by this reference.

While computer-based, digital simulation of full-color halftoning is a desirable objective, practical limitations have hindered its use. As with ordered dithering techniques, a separate bit-mapped image must be composed for each process color of the rendering device. The quantity of data to be processed for such composition is substantial: for example, an 8-inch by 10-inch color image to be rendered with a device having a resolution of 300 dots per inch and one bit per dot (such as an Océ Graphics Model G5232 Color Thermal Plotter) requires composition of four separate images each comprising 7.2 million bits. If the requirement of computing halftone screen patterns at four different angles and for multiple intensity levels within the image is added, substantial additional computing power is needed.

Rather than generating an entire simulated halftone screen for each process color of an image, a set of rectangular repeating patterns can be stored and retrieved for use in filling incremental regions of the image. These patterns can be considered as representing "tiles" to be used to construct a simulated halftone screen. The area of the "tile" may be selected arbitrarily, or as a function of computer hardware requirements. For reasons of hardware read/write efficiency and bit manipulation, these pattern tiles usually have dimensions which are a power of two (typically 8-by-8 or 16-by-16 dot locations) and are typically square. The pattern contained within the pattern tile is usually defined by an external computing process (e.g., an ordered dithering algorithm) or is predefined and selected by an external process (e.g., retrieved from memory). The pattern's dimensions are usually identical to those of the pattern tile. As with patterned wallpaper or floor tiles, these pattern tiles are used as a repeating pattern which is replicated at incremental regions throughout some fill area. Storage of such patterns can consume a large amount of memory. For example, a 32×32 bit pattern would require 32 long words (32 bits each) of storage for each pattern. If the image is to be rendered with four process colors each having 26 intensity levels, 104 minimal tiles must be defined and stored in memory, requiring approximately 13,312 8-bit bytes of memory.

Some current computer graphics chips allow for dynamic definition of a pattern tile for filling polygonal areas. The model DP8500 raster graphics processor, available from National Semiconductor Corporation, uses a set of 16 registers, each register being 16 bits wide, to define the pattern. Each register is used for a specific scan line, repeating horizontally to fill that line. Successive registers are used to fill successive scan lines; the pattern repeats after 16 scan lines. The processor is constructed such that the pattern tile must be 16×16. The NEC model 7200 computer graphics chip, which is no longer in production, is similar in operation to the National Semiconductor model DP8500 processor, is limited in size to a 16×16 pattern, and suffers from the same limitations. The HD63484 ACRTC advanced CRT controller, available from Hitachi, uses a 16×16 pattern RAM. The repeating pattern (and thus the pattern tile) may be defined to be any rectangular area within this pattern RAM, but is limited to a maximum size of 16×16. Its primary drawback, however, is its use of a seed fill algorithm to fill areas. The boundary of the fill area must first be drawn as an outline and then filled. It is also noted that these implementations are limited to binary patterns, and do not allow for multiple bits per dot or pixel.

Unfortunately, the repeating tiles which can be defined with current computer graphics chips are generally not well-suited for digital simulation of halftoning. Digital simulation of halftone screens uses a regular repeating pattern for each intensity level of the four process colors. These repeating patterns are sometimes also referred to as intensity tables. See, for example, J. Foley and A. VAN DAM, FUNDAMENTALS OF INTERACTIVE COMPUTER GRAPHICS (1983), Addison-Wesley Publishing Company, the content of which is incorporated herein by this reference for all purposes. A minimal area of the repeating pattern can be calculated for a given line resolution and halftone screen angle. This minimal area forms a "tile" which can be used to replicate the pattern within any polygonal area. However, the dimension of a side of these minimal tiles for common halftoning angles and line frequencies is usually not a power of two; it may be any integer number, depending upon the desired screen rotation angle. For example, the minimal tile for an angle of 34 degrees would require a 13×13 pattern, and the minimal tile for an angle of 53 degrees would require a 25×25 repeating pattern. Defining a smaller repeating pattern (say 13×13) within the larger repeating tile (say 16×16) of current graphics processor chips would result in the incorrect replication of the repeating pattern throughout the fill area.

To illustrate, FIGS. 1b-1e show an example of a set of repeating patterns which might be used to obtain digital halftoning screens at rotation angles of 26, 33, 18 and 53 degrees, respectively. As can be seen, the halftone screens do not line up on power of 2 boundaries; that is, patterns of 5×5, 13×13 or 25×25 are required to produce simulated halftoning screens of the correct angles. However, the user is constrained by the binary nature of the graphics processor's internal structures to define the tiles as square areas whose dimension on one side is a power of two (e.g., 4×4, 8×8, 16×16, or 32×32). That is, for the pattern to be used as a tile in filling larger polygonal areas, the pattern is forced by the graphics processor's internal structures to repeat at one of those power of two boundaries. Where a pattern does not repeat at one of the power of two boundaries, the patterns of juxtaposed tiles will not match, resulting in perceptible horizontal and vertical "seams" in the rendered image. If a 5×5 repeating pattern is replicated within an 8×8 pattern tile, the patterns of adjacent tiles would be mismatched, resulting in visible "seams" in the rendered image.

SUMMARY OF THE INVENTION

The present invention provides methods and apparatus for utilizing a set of pattern headers to replicate repeating patterns used in digitally-simulated halftone screens. The use of pattern headers in accordance with the invention is suited to digital processing systems which are most efficient when processing data having dimensions which are an integer power of two, yet permits generation of repeating patterns having dimensions which are other than an integer power of two.

In accordance with the present invention, a complete repeating pattern is stored as a one-dimensional-array pattern header, and is generated from that pattern header. The repeating pattern may be arbitrarily smaller than the pattern header and may, for example, comprise a binary bit pattern useful in driving a binary rendering device or a pattern of integer values representing tonal intensities of the digitally-simulated halftone screen useful in driving a variable-dot-size rendering device.

In one form of the invention, a method of generating a digitally-simulated halftone screen for rendering of an image with a rendering device, where the image is made up of a plurality of incremental regions having respective tonal intensities, comprises the steps of:

a. determining tonal intensity of an incremental region of the image;
b. selecting from a set of pattern headers a pattern header representative of the determined tonal intensity;
c. generating from the selected pattern header a repeating pattern corresponding to the determined tonal intensity of the incremental region;
d. repeating steps a.-c. to generate a corresponding portion of the repeating pattern for each incremental region of the image; and e. arranging the portions to produce a digitally-simulated halftone screen of the image.

Steps a.-e. may be repeated for each of a plurality of process colors, such that a digitally-simulated halftone screen of the image is produced for each of the process colors. The repeating pattern is preferably generated from the pattern header by shifting the pattern header a suitable number of places to produce each of a number of rows of values for the repeating pattern. This may be performed in a variety of ways which are described in more detail below.

These and other methods and apparatus in accordance with the present invention are described below with reference to the attached drawing.

BRIEF DESCRIPTION OF THE DRAWING

Figure 1E:
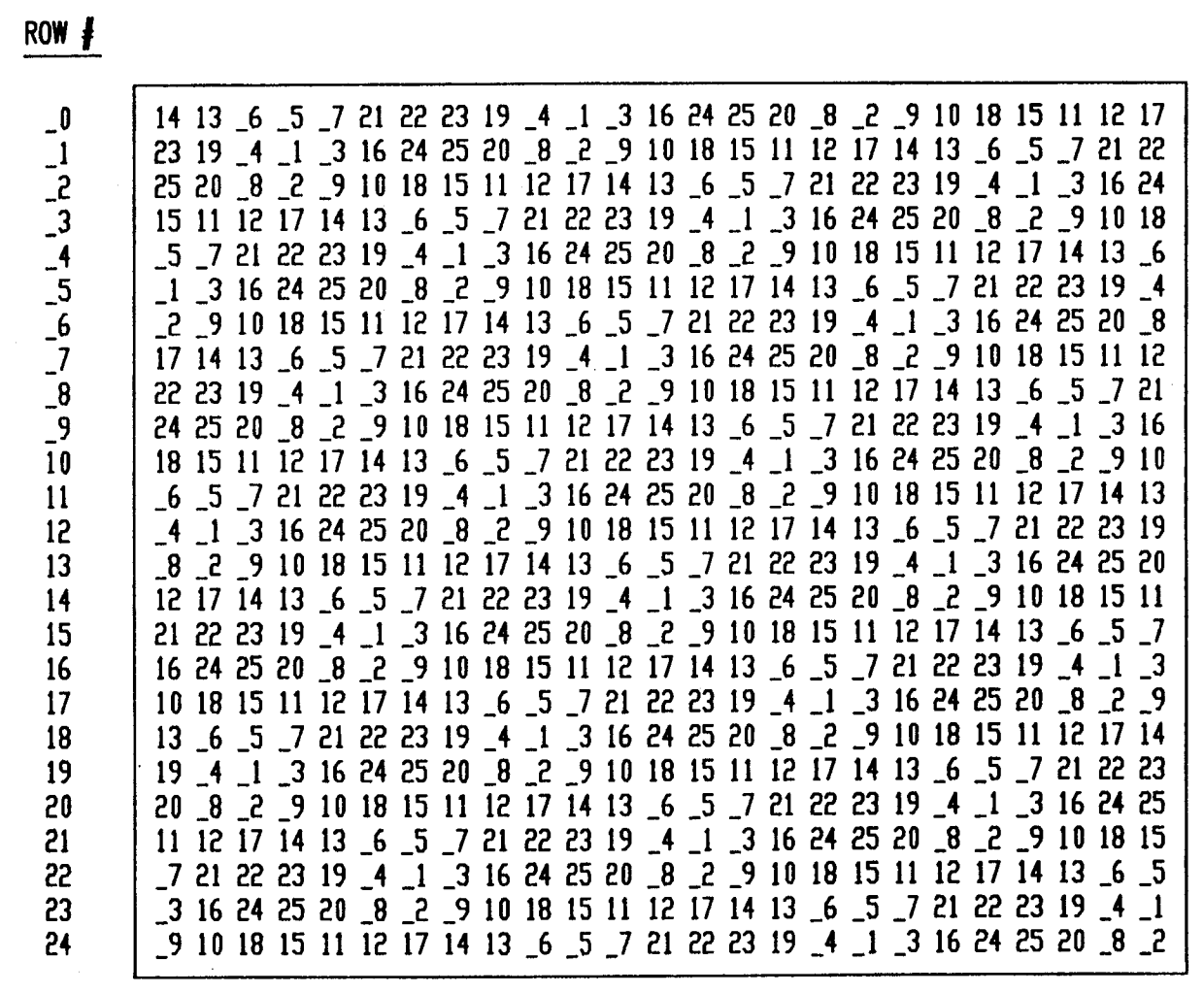

FIG. 1a shows a prior art 2×2 pattern of dots used to approximate five intensity levels;

FIGS. 1b-1e show respectively 5×5, 13×13, 10×10 and 25×25 repeating patterns which may be used to approximate respective simulated halftone screen angles of 26, 33, 18 and 53 degrees;

FIG. 6 illustrates how the repeating pattern of FIG. 5 may be represented as binary repeating patterns and their corresponding pattern headers in accordance with the invention;

FIG. 7 illustrates a 25-by-25 repeating pattern (intensity table) representing a digital halftoning screen of 53 degrees and having 26 tonal intensities in accordance with the invention;

FIG. 9 shows an example of using the method of FIG. 8 to generate the rows of the repeating pattern of FIG. 7 in accordance with the invention;

DETAILED DESCRIPTION OF THE PREFERRED EMBODIMENTS

The present invention is intended to form an integral part of a rasterization process or processor which includes the generation of continuous-tone fill patterns. Typically, an image-rendering process is issued a request to render a particular tonal intensity at a given incremental region of the image. The incremental region may, for example, be a single dot location or a rectangular area beginning at some dot location and representing a multi-dot spot. The present invention concerns the manner in which that tonal-intensity repeating pattern is stored and mapped to the incremental region.

Repeating patterns can be defined to represent a digital halftoning screen for any given line frequency and screen angle. One characteristic of all these patterns (except 45 and 90 degrees) is that any given row of the repeating pattern is composed of the previous row shifted in a manner dependent upon the angle of the halftoning screen. Thus, in accordance with the present invention, the repeating pattern may be stored as a one-dimensional array, referred to herein as a pattern header.

Figure 2:
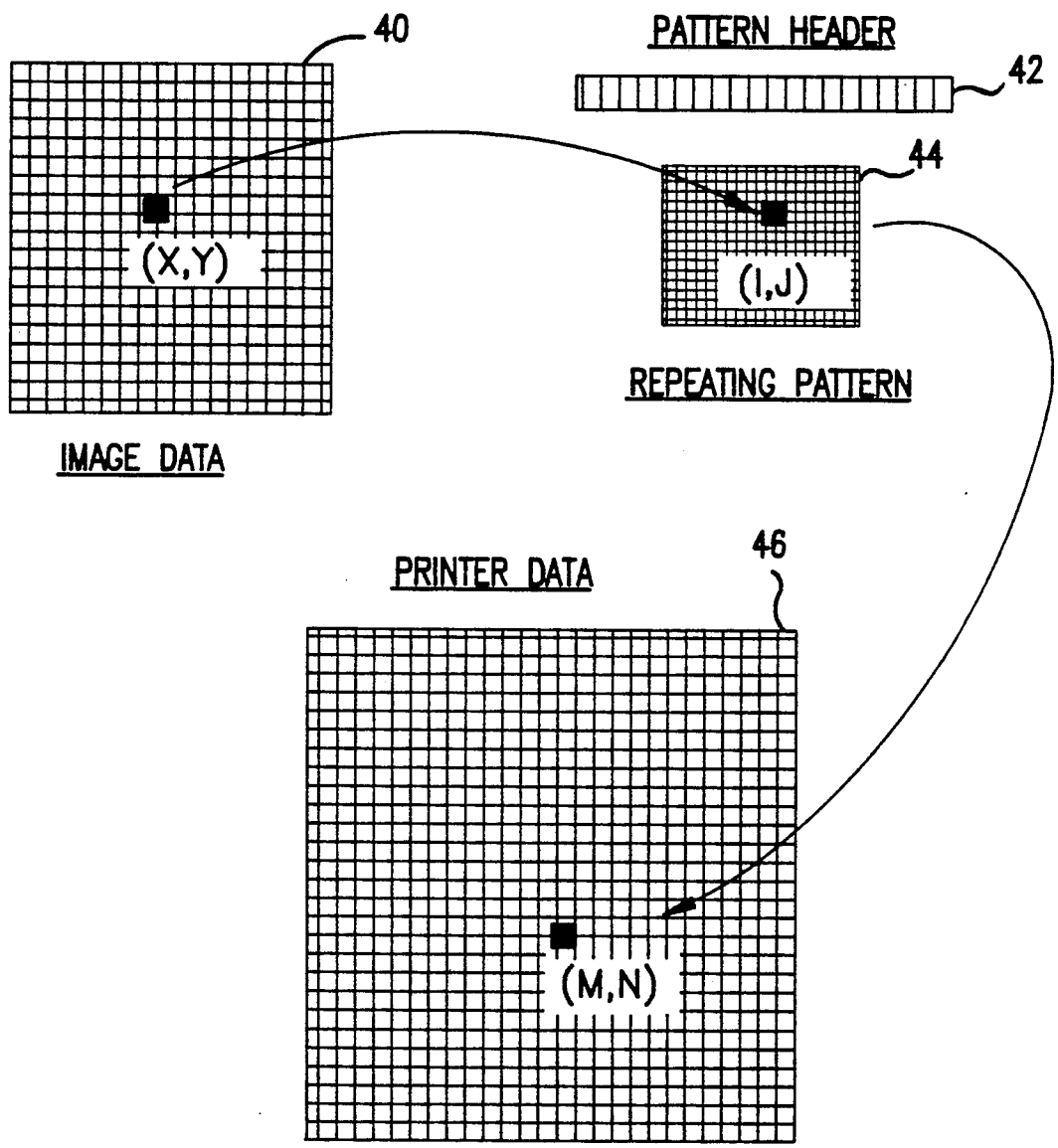
FIG. 2 illustrates the process of mapping the tonal intensity of an incremental region of an image to a repeating pattern, and then to an area of computer memory for printer data in accordance with the invention.

In the context of the present invention, FIG. 2 depicts the process of generating a halftoned, printed copy from some image data, involving the repetitive process of evaluating the tonal intensity of incremental regions (x, y) of the image data 40, and creating a halftone pattern at the corresponding location (m, n) of the printer data 46. The halftone pattern at that location is composed from a small repeating pattern 44, which must correspond to the tonal intensity determined from the incremental region (x, y). The repeating pattern is represented in the present invention by a pattern header 42.

The present invention concerns the methods and apparatus for generating from any pattern header 42, any (i, j) portion of the patterns header's repeating pattern 44 to map to the corresponding area (m, n) of the printer data 46. The incremental region of the image data 40 may be a single pixel (a term defined in the computer industry as a picture element), or may be a collection of pixels or sub-pixels averaged together, or may be a collection of pixels having the same tonal intensity. The corresponding area (m, n) of the printer data 46 may be larger or smaller depending upon whether the image data is being enlarged or reduced. In either case, a repeating pattern representing that tonal intensity must be generated for the corresponding region of the printer data.

Figure 3:
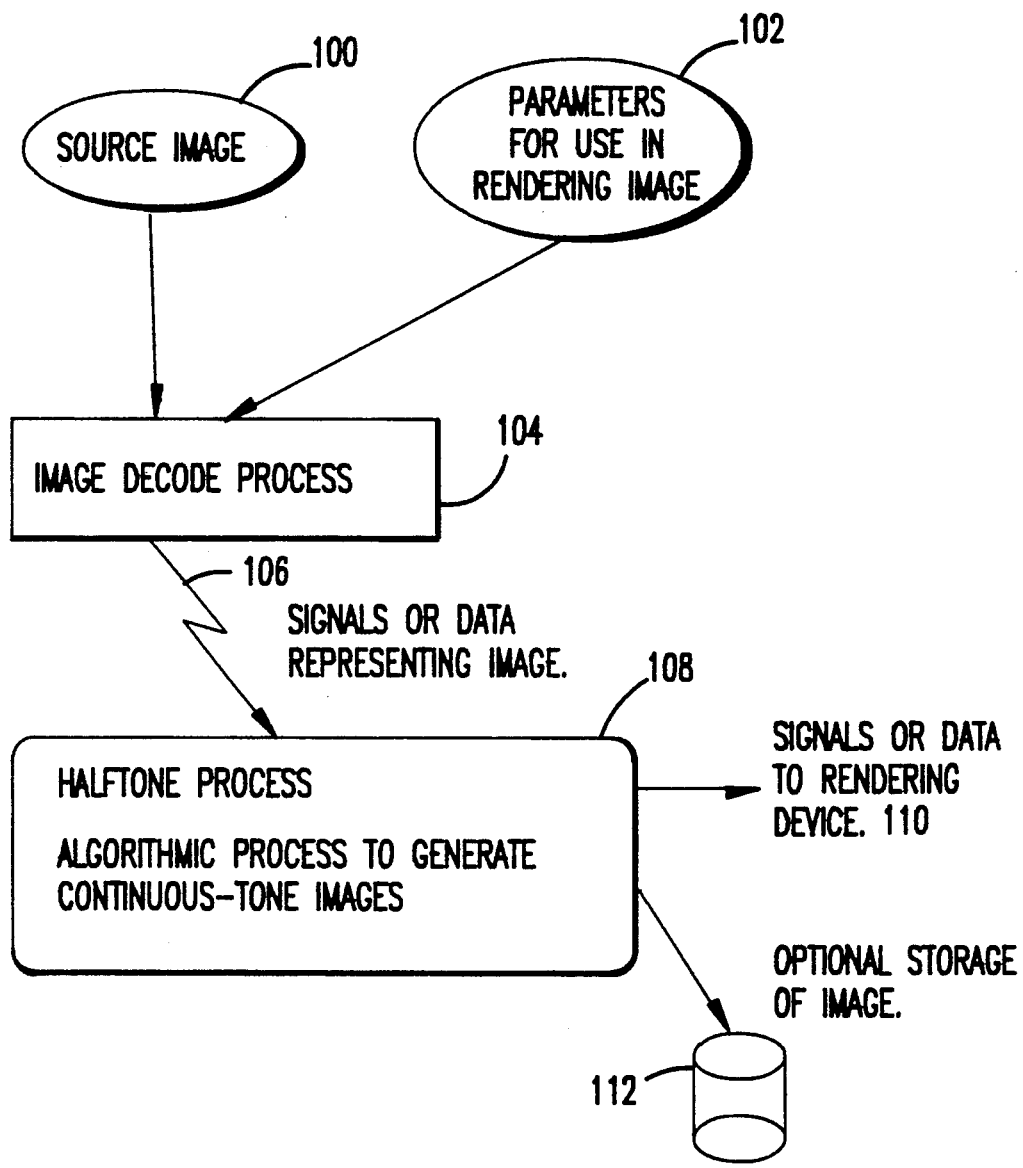
FIG. 3 is a simplified overview of how an image is processed for rendering and/or storage in accordance with the invention.

FIG. 3 provides an overview of the process of rendering an image with digital halftoning in accordance with the present invention. A source image 100 in digital form, and parameters 102 for use in rendering an image, are supplied to an image decoding process 104. The parameters 102 may include such information as a scaling factor or color correction factors. The image decoding process may for example scan image data in a sequential manner, extracting color information for each incremental region of the image, and may be implemented by any suitable means, such as a dedicated graphics processor circuit or a programmed general-purpose processor. Signals or data 106 representing the image are then passed to the halftoning process 108, where a bit-map of a continuous-tone image is generated for each process color. The digital halftoning process 108 may likewise be implemented by any suitable means, such as a dedicated graphics processor circuit or a programmed general-purpose processor. The resulting signals or data 110 are then passed to the rendering device and/or for storage in a storage device 112.

Figure 4:
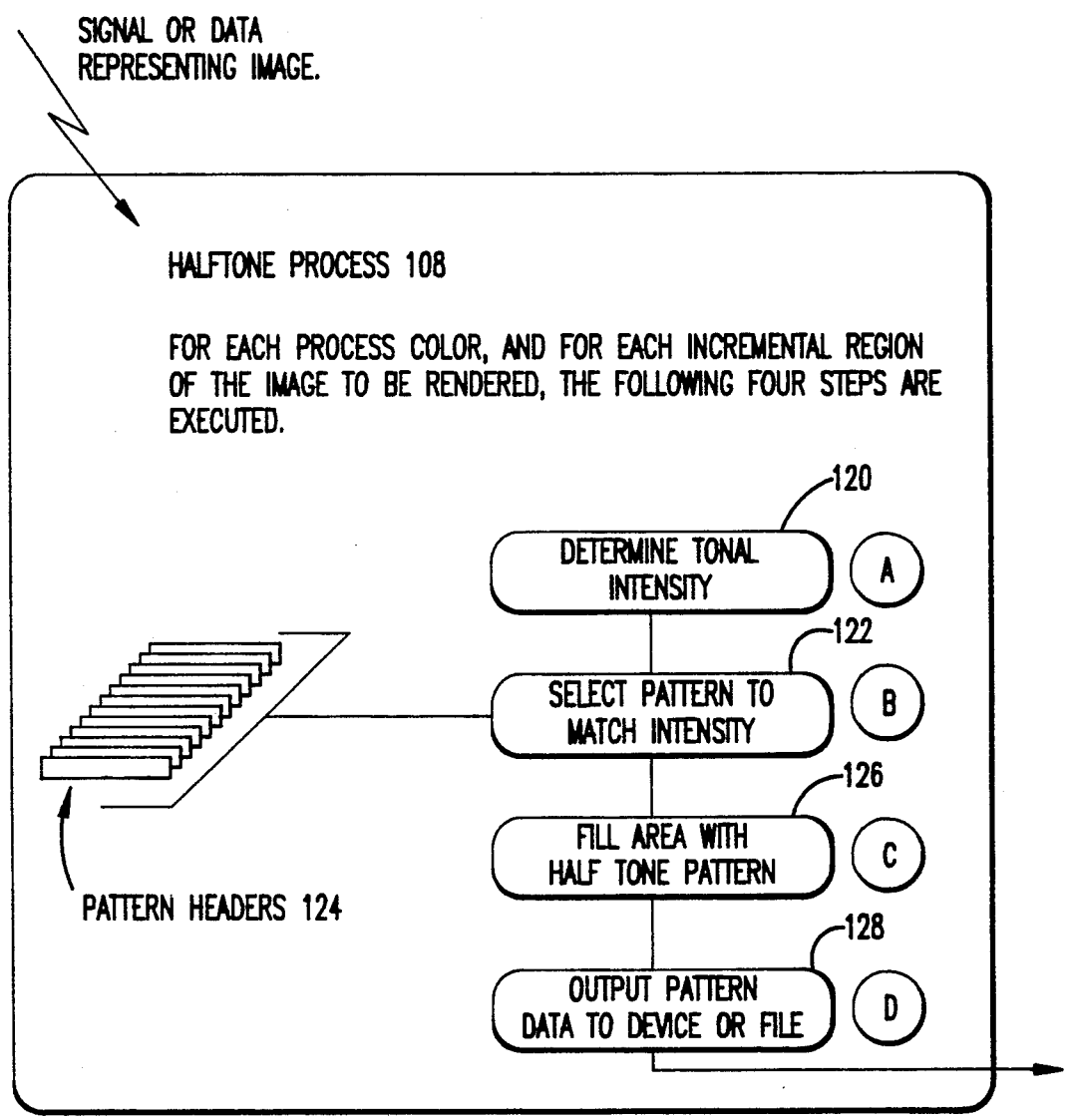
FIG. 4 is a simplified overview of a halftoning process of FIG. 3 in accordance with the invention.

The digital halftoning process 108 of FIG. 3 is illustrated schematically in FIG. 4. For each process color, and for each incremental region of the image to be rendered, four basic steps are performed. First, the tonal intensity is determined at step 120. For example, if the level of red color of the incremental region of the image was evaluated to be a 50% saturation, and if using the intensity table of FIG. 7, it might then be determined that a tonal intensity value of 13 would be appropriate. Second, a halftone pattern header is selected at step 122 from a group 124 of pattern headers to match the required intensity. Third, the area in question is filled with the desired halftone pattern at step 126, the halftone pattern being generated from the selected pattern header. Fourth, the pattern data is output to the rendering device or to a file to be stored at step 128.

In accordance with the preferred embodiments of the present invention, each pattern header is a compact representation of a digital halftoning screen. The pattern header is preferably an x-by-1 array, where x is an integer power of two. Thus, the pattern header may be an $8 \times 1$ array, or a $16 \times 1$ array, or a $32 \times 1$ array, etc. Each entry in the pattern header array may be any number of bits deep; a one-bit-deep entry would be used to represent a binary-dot halftoning screen, for example, while a multi-bit entry may be used to represent dot sizes of a variable-dot-size halftoning screen. The data in the pattern header is usually derived from the first row of the repeating pattern of the halftone screen. However, it may be any row, as long as all the pattern headers for that halftone screen are defined from that same row. If the pattern header is wider than the repeating pattern, the first row of the repeating pattern is repeated until it fills the pattern header. The set of pattern headers is preferably prepared in advance of beginning the rendering process and stored in memory for rapid retrieval, although it will be recognized that the pattern header may be dynamically generated as needed by execution of suitable algorithms, or otherwise made available for selection as needed.

Figure 5:
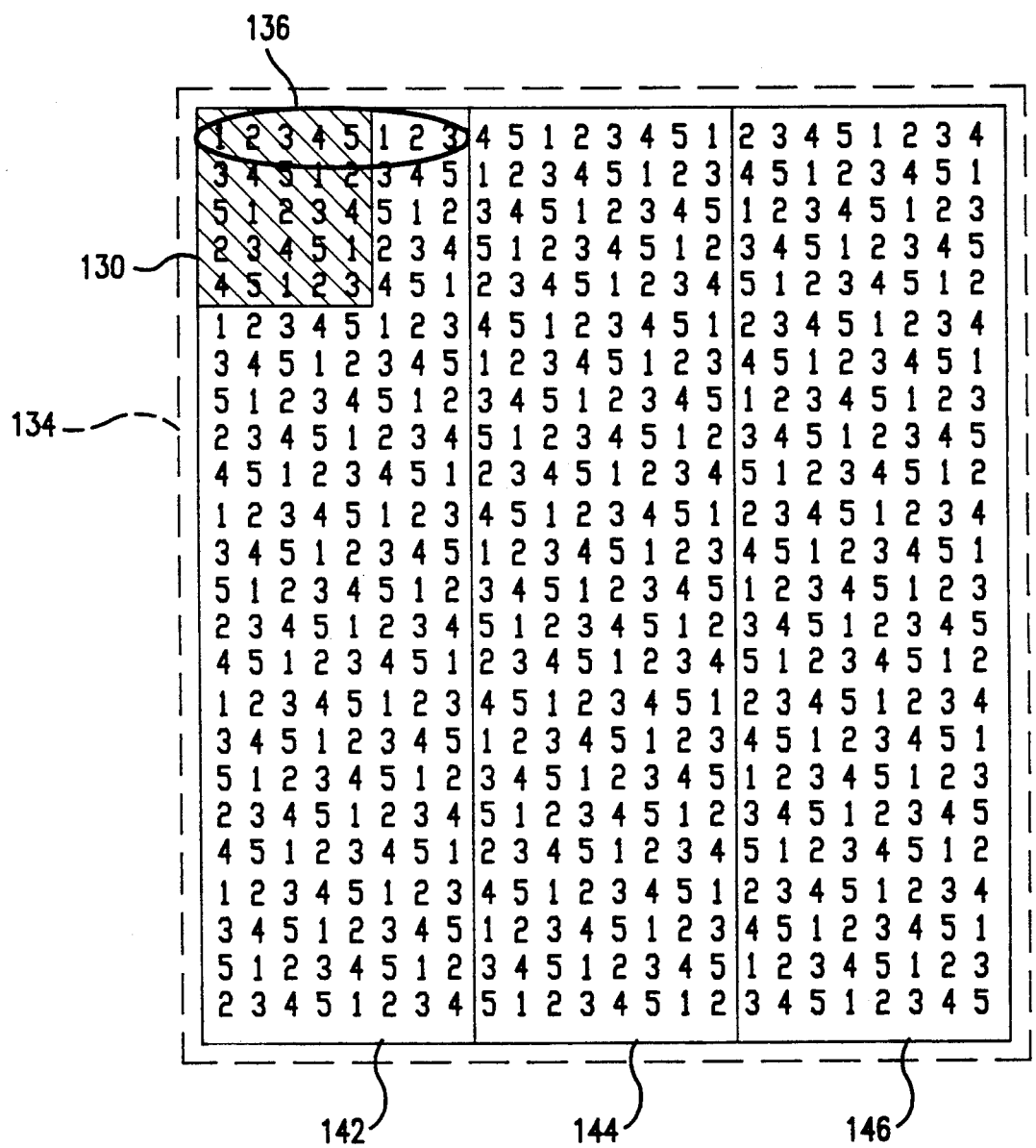
FIG. 5 illustrates the relationship between a "fill area," a "repeating pattern," and a "pattern header" in accordance with the invention.

FIG. 5 shows an example of an intensity table representing a digital halftoning screen having a rotation angle of approximately 63.4 degrees from vertical and having a $5 \times 5$ repeating pattern 130 (indicated by the shaded area) within a $24 \times 24$ fill area 134 (indicated by dashed lines). The first row of the repeating pattern 130 is the integer sequence: 1,2,3,4,5. The pattern header is an 8-by-1 array 136, whose contents are the integer sequence: 1,2,3,4,5,1,2,3 (indicated by a solid dark oval line). There are three columns, the left column 142, the middle column 144, and the right column 146.

FIG. 6 illustrates an example of how the $5 \times 5$ repeating pattern 130 of FIG. 5 may be used to represent patterns of binary dots. In accordance with the preferred practice, the tonal intensity of the incremental region of image data will determine which pattern to use. A unique pattern is provided for each of five approximated intensity levels, shown in order of increasing intensity from top to bottom of FIG. 6. The respective $8 \times 1$ pattern header array for each of the intensity-level patterns is shown to the right of the corresponding pattern. A "1" value indicates that a dot is to be printed, while a "0" value indicates the absence of a dot.

In general, the repeating pattern for any row of width W can be generated from a pattern header of width W if two further pieces of information are known: the width of the repeating pattern (DIM), and a shift value constant (SV). For the description which follows, the term "row" shall mean a "row of width W," where W is also the width of the pattern header. With the pattern header and values for DIM and SV, the repeating pattern for any given row n can be generated by the following method:

$$\text{pattern for row n} = \\ \text{[pattern header shifted left by } SV_n\text{]} \\ \text{logically OR'ed with} \\ \text{[pattern header shifted right by (DIM} - SV_n\text{)]}$$

where n is any positive integer value, and where $SV_n = n \times SV$, modulo DIM. The term "modulo DIM" indicates that the value of $SV_n$ is always less than the value of DIM and is the remainder from division of $(n \times SV)$ by DIM. The value of SV may be greater than or less than zero. A positive shift value SV indicates a left shift, while a negative shift value SV indicates a right shift.

Applying the foregoing method to the example of FIG. 5, the width of the repeating pattern DIM is 5, and the shift value SV is 2. For the top row (row "0") of column 142, $SV_0 = 0 \times 2 = 0$, and abs $|DIM - SV_0| = 5 - 0 = 5$. The pattern for row "0" is derived by shifting the pattern header to the left zero places, and logically OR'ing that with the pattern header shifted right five places. This turns out to be identical to the pattern header itself. When this occurs the process generating the patterns can either perform the shifts and generate an identity pattern, or check for this case and do nothing, whichever is easier. For the next row (row "1"), $SV_1 = 1 \times 2 = 2$, and abs $|DIM - SV_1| = 5 - 2 = 3$. To generate the pattern for row "1", the pattern header is shifted left by two places, and then logically OR'ed with the pattern header shifted right by three places. For the next row (row "2"), $SV_2 = 2 \times 2 = 4$, and abs $|DIM - SV_2| = 5 - 4 = 1$. To generate the pattern for row "2", the pattern header is shifted left by four places, and then logically OR'ed with the pattern header shifted right by one place. For the next row (row "3"), $SV_3 = 3 \times 2 = 6$ (modulo 5) = 1, and abs $|DIM - SV_1| = 5 - 1 = 4$. To generate the pattern for row "3", the pattern header is shifted left by one place, and then logically OR'ed with the pattern header shifted right by four places. This process can be continued to fill all rows in column 142. In this manner, the entire column 142 containing the repeating pattern 130 of FIG. 5 may be generated from the 8×1 pattern header array 136.

Once a pattern header (or the pattern for any row) and values of DIM and SV are known, the patterns for an indefinite number of additional rows of the repeating pattern can be generated with the foregoing method.

Inspection of FIG. 5 reveals that the pattern headers for the middle and right columns (144 and 146, respectively) are different from that of the left column 142. These pattern headers can generated from the original pattern header 136 using a variation of the foregoing method, in which the shift value SV is determined as a function of the width W of the pattern header and the width DIM of the repeating pattern. In the example of FIG. 5, the width W of the pattern header is 8, and the width DIM of the repeating pattern is 5. The shift value SV is thus set such that $SV = (W - DIM) = (8 - 5) = 3$.

Thus, the pattern header for a column m+1 may be generated from the pattern header for a preceding column m according to the following method:

$$\text{pattern header for column m} + 1 = \\ \text{(pattern header for column m shifted left by SV)} \\ \text{logically OR'ed with} \\ \text{(pattern header for column m shifted right by (DIM} - SV\text{))}$$

For example, the pattern header for row 0 of column 144 (the center column) of FIG. 5 is produced by shifting the pattern header for column 142 (left column), row 0, left by three places and right by 2 places ($|DIM - SV| = |5 - 3| = 2$), and logically OR'ing the results.

Thus, once the pattern header for a single column is known, pattern headers for any number of additional columns can be generated in accordance with the invention. And, once the pattern header for a column is available, any number of pattern rows can be generated for that column. Accordingly, the repeating pattern represented by a single x×1 pattern header can be replicated over any size fill area. The entire fill area 134 can be filled either row by row (by generating subsequent pattern headers), or column by column (by generating subsequent rows from each pattern header). Those skilled in the art will see that this method can be used to align the repeating pattern with the upper left corner of any fill area (defined by an (x, y) coordinate pair), and then to proceed as described above to fill that area.

The method described above with reference to FIGS. 5 and 6 permits generation of the pattern for any given row n from the pattern header and values of DIM and SV. A further embodiment of the present invention will now be described with reference to FIG. 7, in which the pattern for any given row n+1 can be generated from the pattern for the preceding row n. In general, the pattern for any given row may be generated from the pattern for the preceding row, where SV is now a constant value in accordance with the following method:

$$\text{pattern for row n} + 1 = \\ \text{(pattern for row n shifted left by SV)} \\ \text{logically OR'ed with} \\ \text{(pattern for row n shifted right by DIM} - SV\text{)}$$

where DIM is the width of the repeating pattern and SV is a shift value constant.

Figure 7:
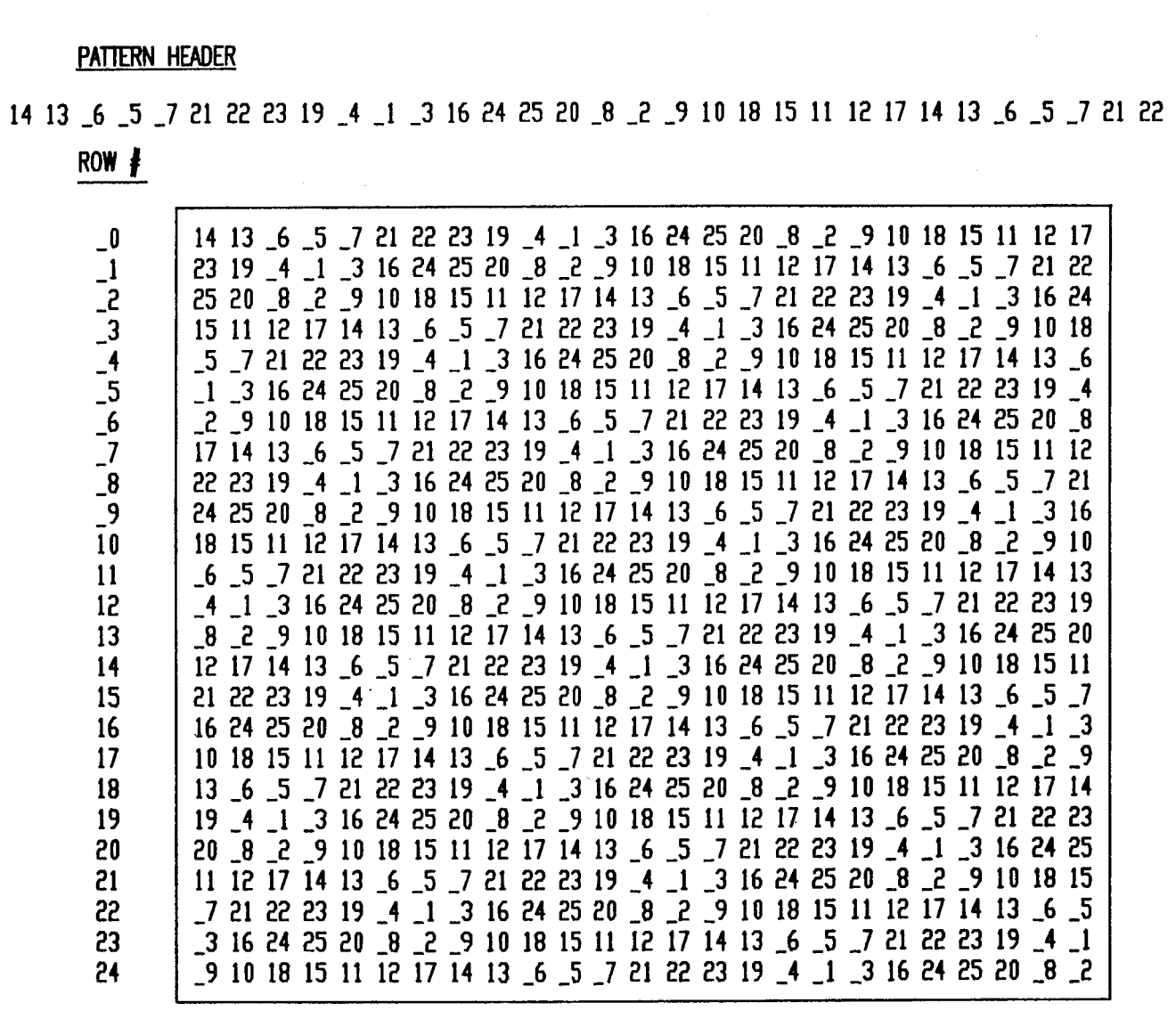

The example of FIG. 7 shows a 25×25 repeating pattern and its 32-entry pattern header for a digital halftoning screen at a 53 degree rotation angle having 26 tonal intensities. The repeating pattern is represented as an intensity table of integer values ranging from 1 to 25. Given the pattern for any row n (for example, the pattern of row _0), the value of DIM=25, and the left-shift constant SV=7, the pattern for any row n+1 (for example, the pattern of row _1) of the repeating pattern can be generated in accordance with the present invention.

Figure 8:
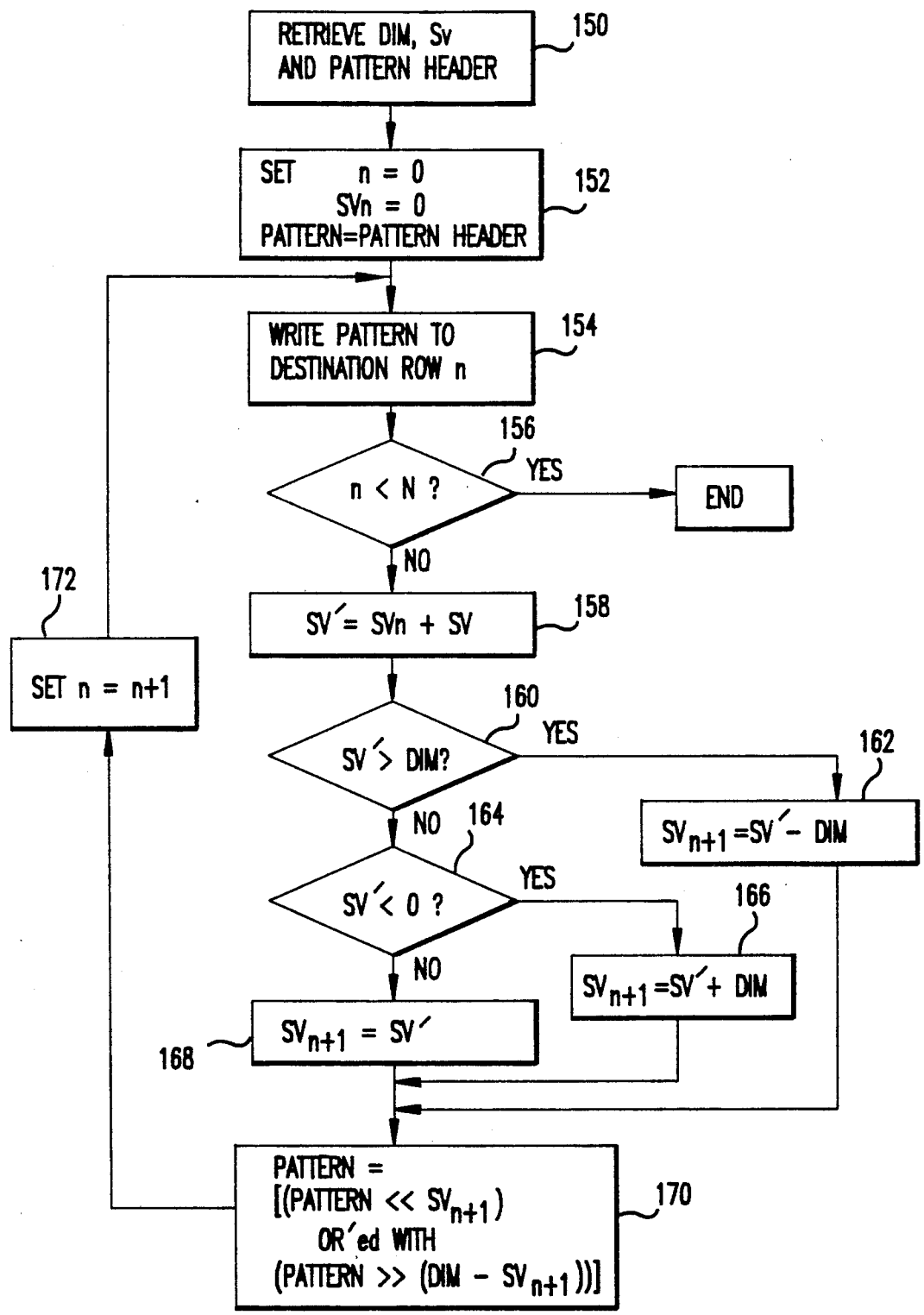
FIG. 8 is a flow chart of a method in accordance with the present invention which may be used to generate subsequent rows of a repeating tile from a pattern header representing some repeating pattern.

FIG. 8 shows in the form of a flow chart a preferred method in accordance with the invention for generating the repeating pattern for rows of a column from a pattern header. The process begins at step 150 with the selected pattern header and predetermined values for DIM and SV. The pattern header may be retrieved from storage in a RAM or ROM lookup table, or generated by a suitable circuit, or provided from any other appropriate source. Variables for the row number n and the shift value $SV_n$ of row n are set (for example, n=0, $SV_n=0$) at step 152. The pattern header is then written to the destination row (e.g., row 0) in step 154. If the value of n is determined in step 156 to be less than a value N (representing the highest row number for which a pattern is to be generated), the process continues with step 158; otherwise, the process is ended. A provisional shift value SV' for the succeeding row is calculated in step 158 such that SV'=$SV_n$+SV. The modulo DIM operation is performed on the provisional shift value SV' with steps 160 through 168. The provisional shift value SV' is tested in step 160 to determine if it is greater than the value of DIM. If it is, the shift value $SV_{n+1}$ for row n+1 is calculated in step 162 such that $SV_{n+1}$=SV'−DIM. If the value of SV' does not exceed the value of DIM (in step 160), it is tested in step 164 to determined whether it is less than zero. If SV' is less than zero, $SV_{n+1}$ is set equal to SV'+DIM in step 166. If SV' is not less than zero, $SV_{n+1}$ is set equal to SV' in step 168. Once the shift value $SV_{n+1}$ has been thus determined for row n+1, the pattern for row n+1 is produced in step 170 by left-shifting the pattern header by a number of places equal to $SV_{n+1}$, right-shifting the pattern header by a number of places equal to DIM−$SV_{n+1}$, and logically OR'ing the thus-shifted pattern headers. The value of n is then incremented in step 172 such that n=n+1, and the pattern is written to destination row n in step 154. The process is continued until all rows of the column are complete.

FIG. 9 shows in more detail how rows _1, _2, and _3 of FIG. 7 may be generated from the pattern header and the values of SV=7 and DIM=25 using the method of FIG. 8. The pattern header is written to row _0 without shift. For row _1, the pattern header is left-shifted by 7 places ($SV_1$=$SV_0$+SV=0+7=7) and right-shifted by 18 places (DIM−SV=25−7=18); the shifted patterns are then logically OR'ed to produce the pattern for row _1. For row _2, the pattern header is left-shifted by 14 places ($SV_2$=$SV_1$+SV=7+7=14) and right-shifted by 11 places (DIM−$SV_2$=25−14=11); the shifted patterns are then logically OR'ed to produce the pattern for row _2. For row _3, the pattern header is left-shifted by 21 places ($SV_3$=$SV_2$+SV=14+7=21) and right-shifted by 4 places (DIM−$SV_3$=25−21=4); the shifted patterns are then logically OR'ed to produce the pattern for row _3.

Thus, once a pattern header (or the pattern for any row of the repeating pattern) and values of DIM and SV are known, the patterns for an indefinite number of additional rows and columns of the repeating pattern can be generated.

Figure 10:
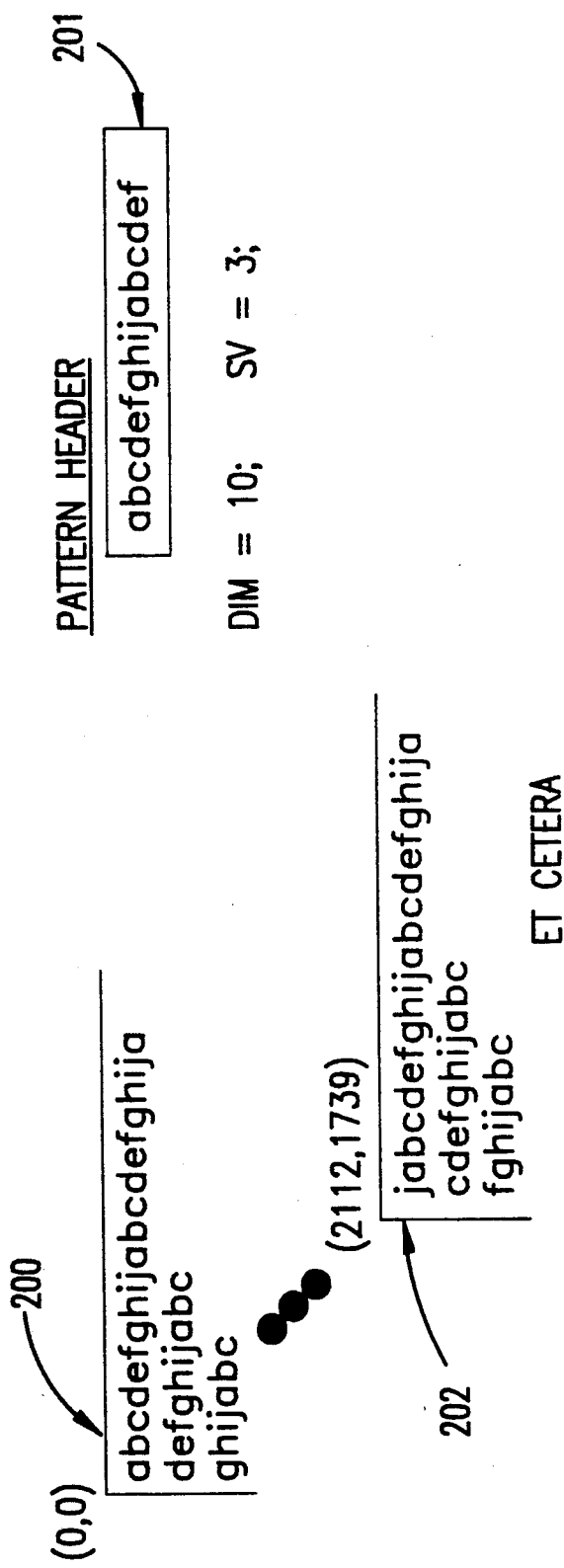
FIG. 10 demonstrates how a pattern header representing a generic 10-by-10 repeating pattern can be mapped to an arbitrary coordinate location (x, y) in accordance with the invention.

FIG. 10 shows how any repeating pattern represented by its pattern header can be easily mapped to an arbitrary (x, y) coordinate location. The pattern header 201 represents a 10×10 repeating pattern which originates at the location (0, 0), and has a dimension property DIM=10, and a shift value SV=3. To determine how this 16-entry pattern header should appear at the location (x, y) a shift value $SV_{xy}$ needs to be calculated. The simple mathematical calculation for this is $SV_{xy}$=(x+(y*SV)) modulo DIM. This temporary shift value $SV_{xy}$ is then used to re-align the pattern header for that (x, y) location. The normal shift value SV is then used on this re-aligned pattern header in the manner previously described for this invention to continue the replication of the repeating pattern from that (x, y) location. In FIG. 10, the repeating pattern as it appears at the origin is depicted by 200, and the repeating pattern as it would appear at coordinate location (2112, 1739) is depicted by 202. Those skilled in the art will recognize how this technique can be used to align the pattern to byte or word boundaries and how to use traditional techniques to mask out unused bits.

Figure 11:
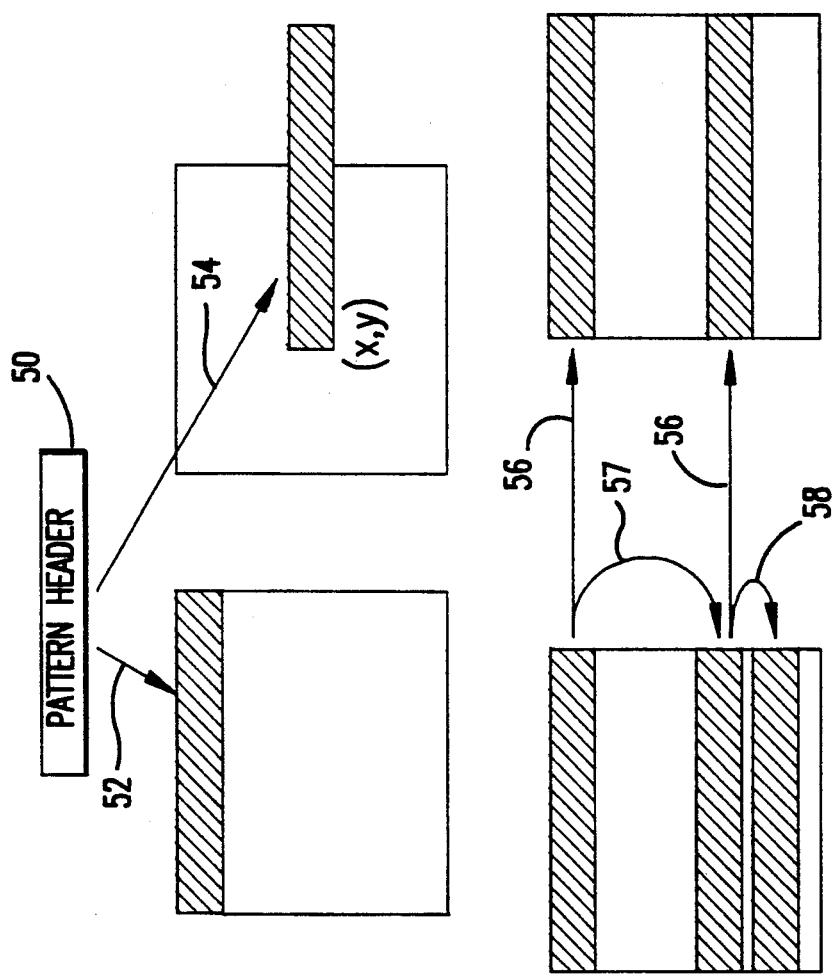
FIG. 11 depicts the basic operations performed on the shift value SV in accordance with the invention.

FIG. 11 depicts the basic operation performed on the shift value SV in order to generate the desired pattern row from the pattern header. Any given pattern header defined by a width W and a shift value SV represents a repeating pattern of width DIM, where W is an integer power of two, and DIM<W. From pattern header 50, one method 52 would generate a repeating pattern row of width W for the top of a column which is aligned on a power of two boundary, or another method 54 would generate the repeating pattern row for any non-aligned (x,y) coordinate location. From any given row (aligned or non-aligned), the methods described in this invention can generate either the next adjacent row 56, or the nth subsequent row 57, or the very next row 58 can be generated. Each of these methods performs a slightly different operation upon the shift value SV.

To generate the appropriate shift value for operation 52, 54, 56, 57, and 58 of FIG. 11 the following formulas are used:

| | | |
|---|---|---|
| 52 | $SV_x$ | = X modulo DIM |
| 54 | $SV_{xy}$ | = (X + (Y * SV)) modulo DIM |
| 56 | $SV_{(x + w)}$ | = W − DIM |
| 57 | $SV_n$ | = (SV * n) modulo DIM |
| 58 | $SV_{(n + 1)}$ | = ($SV_n$ + SV) modulo DIM |

The inventor has found that a 32×1 pattern header (representing any repeating pattern whose dimensions are less than or equal to 32×32 ) is adequate for most commonly-used screen rotation angles needed at the resolutions encountered in currently-available color thermal and ink jet printers which produce binary-dots. Such resolutions are typically 300×300 dots per inch to 600×600 dots per inch.

Using traditional techniques, storage of an entire 32×32 bit pattern tile would require 32 long words (32 bits each) of storage for each pattern. If an image is to be rendered with four process colors each having 26 intensity levels, 104 pattern tiles must be defined and stored in memory, requiring approximately 13,312 8-bit bytes of memory. In contrast, the present invention requires storage of only one "long word" (four 8-bit bytes) of data for each intensity pattern. Thus, only about 428 total bytes of memory are required to store the patterns needed to define all intensity patterns for all process colors. By shifting the retrieved pattern header appropriately in accordance with the invention, a repeating pattern can be generated for any area of the printer's (or other rendering device's) page.

An embodiment of the present invention has been implemented in software on a Sun Microsystems 3/160 workstation for rendering with an Océ Graphics Model 5232 Color Thermal Printer. This implementation was used to print image files stored in the packed-pixel data format, a data format used by Océ Graphics. The source code for this program in the "C" programming language is attached hereto as Appendix A.

A further embodiment of the present invention utilizes a relatively longer pattern header. If a rendering device has a maximum resolution of, for example, 3008 dots in an output line, and the repeating pattern width is 25, a pattern header can be defined to be any array of (3008+25) entries. Referring to FIG. 7, it is evident that the first entry of each row would be found somewhere in the first 25 entries of this very long pattern header.

The first row of the halftone pattern would then be defined by this pattern header. By referencing this very long pattern header through a pointer, subsequent rows of the pattern on the particular rendering device can be generated by adjusting the pointer to point to the appropriate position in the first 25 entries of this very long pattern header. Since the pointer is considered the beginning of the array, this operation would be similar to shifting the entire array. Those skilled in the art will recognize that this embodiment may be used to generate complete halftoning patterns to fill any given area.

A repeating pattern may be developed for any combination of angle and line frequency in accordance with the present invention. The actual angle used is an approximation based upon the resolution of the output device. The repeat pattern is fixed in dependence upon the angle: different angles will require different repeat patterns and different repeat pattern sizes. Given the resolution of the rendering device to be used, and the desired angles, halftoning screens can be digitally simulated.

The following tables give halftone screen rotation angles from zero degrees to ninety degrees which can be obtained for the following line frequencies: 85, 75, 60, 55. The resulting size of the repeating tile is given for each entry. It can be seen that there is a tradeoff between resolution and the desired screen rotation angles. With a line frequency of 85 only a small number of angles can be represented. With a line frequency of 75, a larger number of angles can be represented, and so on.

| Angle | Angle Used | Tile Size |
|---|---|---|
| Line Frequency = 85 | | |
| 00-08 | 0.0 | 4 × 4 |
| 09-25 | 18.4 | 10 × 10 |
| 26-44 | 33.6 | 13 × 13 |
| 45 | 45.0 | 4 × 4 |
| 46-64 | 56.3 | 13 × 13 |
| 65-81 | 71.5 | 10 × 10 |
| 82-90 | 90.0 | 4 × 4 |
| Line Frequency = 75 | | |
| 00-07 | 0.0 | 4 × 4 |
| 08-22 | 14.0 | 17 × 17 |
| 23-28 | 26.5 | 10 × 10 |
| 29-38 | 33.6 | 13 × 13 |
| 39-51 | 45.0 | 6 × 6 |
| 52-61 | 56.3 | 13 × 13 |
| 62-67 | 63.4 | 10 × 10 |
| 68-82 | 75.9 | 17 × 17 |
| 83-90 | 90.0 | 4 × 4 |
| Line Frequency = 60 | | |
| 00-05 | 0.0 | 5 × 5 |
| 06-17 | 11.3 | 26 × 26 |
| 18-25 | 21.8 | 29 × 29 |
| 26-30 | 26.5 | 10 × 10 |
| 31-44 | 36.8 | 25 × 25 |
| 45 | 45.0 | 8 × 8 |
| 46-60 | 53.1 | 25 × 25 |
| 61-64 | 63.4 | 10 × 10 |
| 65-72 | 68.1 | 29 × 29 |
| 73-84 | 78.6 | 26 × 26 |
| 85-90 | 90.0 | 5 × 5 |
| Line Frequency = 55 | | |
| 00-05 | 0.0 | 6 × 6 |
| 06-08 | 9.0 | 37 × 37 |
| 09-15 | 11.3 | 26 × 26 |
| 16-26 | 21.8 | 29 × 29 |
| 27-35 | 30.9 | 34 × 34 |
| 36-39 | 36.8 | 25 × 25 |
| 40-50 | 45.0 | 8 × 8 |
| 51-54 | 53.1 | 25 × 25 |
| 55-63 | 59.0 | 34 × 34 |
| 64-74 | 68.2 | 29 × 29 |

-continued

| Angle | Angle Used | Tile Size |
|---|---|---|
| 75-81 | 78.7 | 26 × 26 |
| 82-84 | 80.53 | 37 × 37 |
| 85-90 | 90.0 | 6 × 6 |

As noted above, the rotation angles between the process-color screens must be maintained at least 15 degrees apart to prevent moiré patterns from developing in the rendered image. It will be seen from the foregoing tables that this requirement can be met by selecting suitable patterns whose dimensions are 32×32. Since the rotation angles for patterns greater than 32×32 in size are not required for a set of acceptable rotation angles, a 32-bit processing system has been found adequate to produce acceptable rendered images using digital halftoning techniques with currently-available rendering devices. For more precise digital simulation of specific angles, larger repeating patterns might be required. These larger patterns might then require a 64-entry or larger pattern header.

With the very high resolution screens used by printers in conventional color halftoning, process-color images are typically rendered at screen angles of 0 degrees (vertical), +90 degrees, −15 degrees and +15 degrees. Since the rendering devices commonly available for digital halftoning are of considerably lower resolution, ±15 degrees cannot be exactly represented. Angles of ±11 degrees or ±21 degrees can be substituted, however. Experiments with a particular 300×300 dot-per-inch rendering device have shown acceptable results with screen rotation angles of −11 degrees, +11 degrees, +36 degrees and +54 degrees for the respective four process colors with such device. The foregoing table shows that these screen angles may be obtained with repeating pattern tile sizes no greater than 32×32.

The examples given herein are intended to illustrate only some possible uses of the present invention. Those of skill in the art will recognize that the particular values to be used will depend upon the particular implementation. The most advantageous screen rotation angles for a given rendering device will depend upon the characteristics of the rendering device and are best selected by experimentation. Once those angles are determined for a given rendering device, they preferably remain fixed for that rendering device.

The methods of the present invention may be implemented in any of a variety of ways. For example, they may be implemented in software executed in a general-purpose host processor (e.g., as in the example of Appendix A) or in a dedicated processor (such as a graphics accelerator circuit). All or part of the method may be carried out by discrete logic elements, as a programmed logic array, as an integrated circuit designed using standard design techniques, or in any other suitable manner. The repeat patterns may be stored in RAM or ROM lookup tables, with the shift and logical OR operations being performed by well-known circuit devices. In any of these implementations, the present invention may be used to generate digitally-simulated halftoning patterns for use with any raster-format rendering devices, such as those offered by Ocè Graphics USA Inc. or others.

Figure 12:
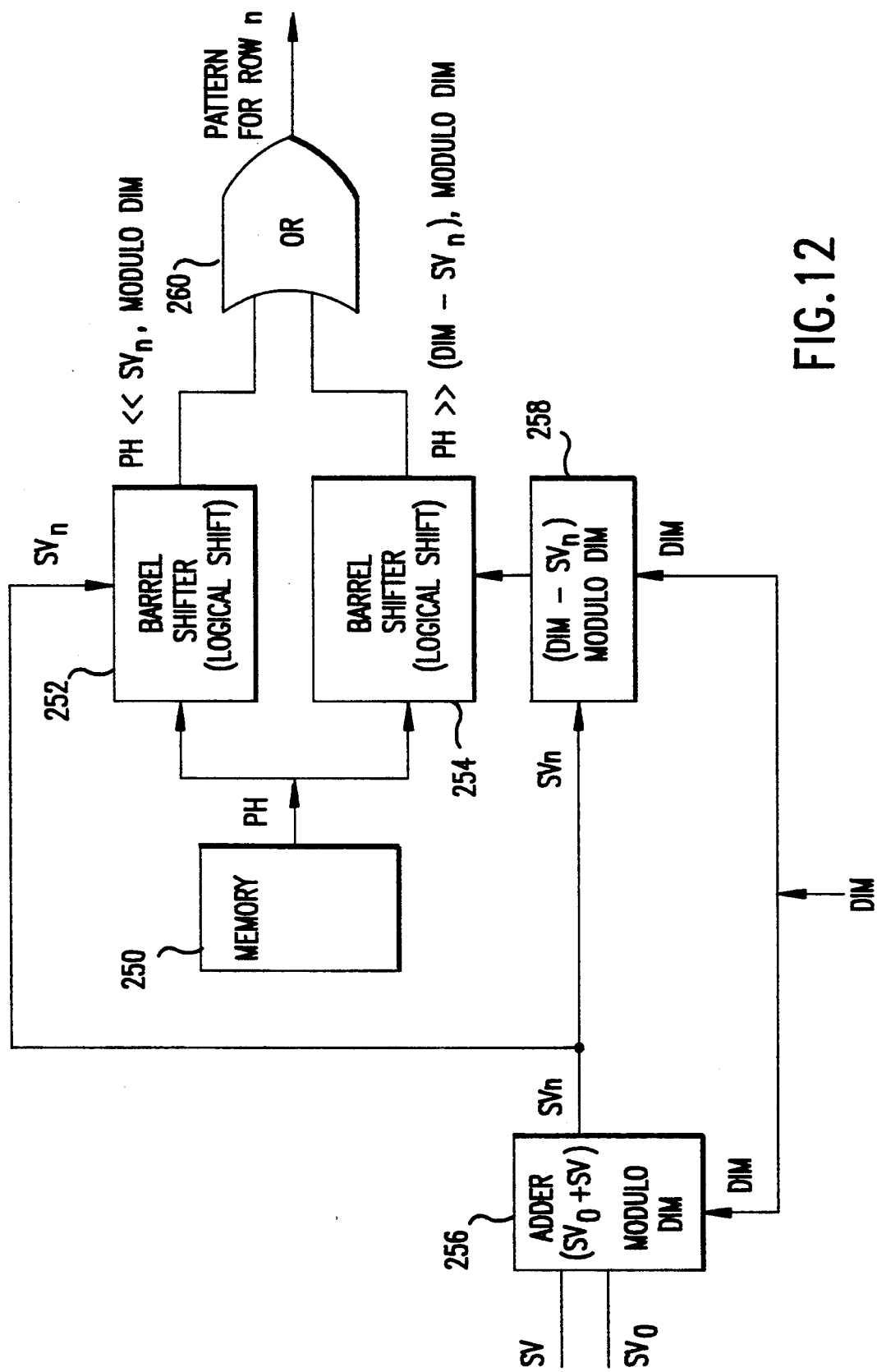
FIG. 12 illustrates in block schematic form an apparatus for generating patterns from a pattern header for successive rows of a pattern tile in accordance with the invention.

FIG. 12 shows in block schematic form one possible circuit configuration for carrying out the methods of the present invention. A pattern header PH stored in a RAM or ROM device 250 is supplied to respective barrel shifters 252 and 254 which perform logical shifts (not arithmetic shifts). A shift value constant SV and a shift value $SV_o$ are supplied to an adder 256 which produces a shift value $SV_n$ for a given row n of the repeating pattern. The pattern header PH supplied to barrel shifter 252 is left-shifted ("<<") by a number of places equal to $SV_n$. A value DIM representing the width of the repeating pattern, and the value of $SV_n$ are supplied to a further circuit element 258 which supplies the value of $DIM-SV_n$ to barrel shifter 254. The pattern header PH supplied to barrel shifter 254 is right-shifted (">>") by the value of $DIM-SV_n$. The thus-shifted pattern headers are then logically OR'ed by circuit element 260 to produce the pattern for row n. The process is repeated row-by-row until the area to be filled is completed.

It is believed that, whatever the specific implementation, the present invention offers important advantages over prior art techniques for digitally-simulated halftoning. For example, less memory space is required in implementing the present invention than techniques which involve storage and retrieval of entire pattern tiles. Also, the inventive methods can be performed quickly because the operations to be performed—a $2^n \times 1$ read operation, a shift and a logical OR—are simple ones which can be performed "on the fly" (dynamically) more quickly than the types of calculations used previously for setting up rendering masks.

The preferred embodiments described above are merley illustrative of the present invention, and are not intended to limit the scope of the invention. Those of skill in the art will recognize that many further modifications to the embodiments described above may be made within the spirit and scope of the invention as defined in the claims which follow.

Appendix A

C_SPOT.H;1

```
/*
 * CTP Halftoning demo.
 *
 * Chris Duffy
 *
 * Initialization include file, defining the Cyan spot function.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */

/*
 * Compile-time definitions for halftone dot patterns.
 * The format is:
 *    i_value         dx      dy
 *    ...
 *    i_value         dx      dy
 *
 * where i_value may or may not increase for each entry.  Thus
 * if two or more dots are to be placed for a given intensity
 * value, then the i_value would not increment at the next line.
 * The terminating entry is one where the i_value is zero (0).
 *
 * The C code will appear as:
 *      static short C_spot[] ={
 *      #include "C_spot.h"
 *      };
 */
        1,      0,      0,
        2,      0,      1,
        3,      1,      0,
        4,     -1,      0,
        5,      0,     -1,
        6,     -1,     -1,
        7,      1,     -1,
```

```
     8,   -1,    1,
     9,    1,    1,
    10,    2,    1,
    11,    1,   -2,
    12,   -1,    2,
    13,   -2,   -1,
    14,    1,    2,
    15,    0,   -2,
    16,    2,    0,
    17,    0,    2,
    18,   -1,   -2,
    19,   -2,    0,
    20,   -2,    1,
    21,    2,   -1,
    22,    3,   -1,
    23,   -3,    0,
    24,    3,    0,
    25,   -3,    1,
     0,    0,    0
```

HALFTONE.H;1

```c
/*
 * CTP Halftoning demo.
 *
 * Chris Duffy
 *
 * Data Structures.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */ define CYAN                            0x08
define MAGENTA                         0x04
#define YELLOW                          0x02
define BLACK                           0x01 define RED                             (MAGENTA | YELLOW)
define GREEN                           (CYAN | YELLOW)
#define BLUE                            (CYAN | MAGENTA)

struct point
{
    int                                 x;
    int                                 y;
};

#define NILPOINT                        ((struct point *)NIL)
define NPOINTS                         1000 struct path
{
    struct point                        *point;
    struct path                         *next;
```

```c
};

#define NILPATH                              ((struct path *)NIL)
define NPATHS                               1000 define SPOT_W         10
define SPOT_H         10
#define DEGTORAD                             3.1415926535/180;

struct grid
{
    float                           real_angle;
    float                           real_resolution;
    /*
     * width and height are relative to the pattern periodicity
     * and do not include the x- and ymargins.
     */
    int                             width;
    int                             height;
    int                             xmargin;
    int                             ymargin;
    struct path                     *centers;
};
#define NILGRID            ((struct grid *)NIL)

/*
 * The following variables (through *spot) are globally declared
 * in init.c
 */
extern int      Values;         /* num intensity values per color */
extern float    Resolution;     /* resolution of device in dots/inch */
extern float    Dot_to_dot_dist; /* default on center distance */
extern int      Line_resolution; /* default=Resolution/dot_to_dot */
extern int      Max_X_used;     /* max extent of image plane used */
extern int      Max_Y_used;
extern int      Spot_w,         /* Spot width in dots */
                Spot_h,         /* Spot height in dots */
                Spot_cx,        /* x offset to center of dot */
                Spot_cy;        /* y offset to center of dot */
extern int      C_w;            /* Cyan fill pattern pixrect size */
extern int      C_h;
extern int      C_xmargin;
extern int      C_ymargin;
extern float    C_value;    /* Cyan intensity value */
extern float    C_angle;    /* grid rotation angle for Cyan */
extern float    C_real_angle;   /* implemented rotation angle */
extern int      M_w;        /* Magenta fill pattern pixrect size */
extern int      M_h;
extern int      M_xmargin;
extern int      M_ymargin;
extern float    M_value;    /* Magenta intensity value */
extern float    M_angle;    /* grid rotation angle for Magenta */
extern float    M_real_angle;   /* implemented rotation angle */
extern int      Y_w;        /* Yellow fill pattern pixrect size */
extern int      Y_h;
extern int      Y_xmargin;
extern int      Y_ymargin;
extern float    Y_value;    /* Yellow intensity value */
```

```
extern float    Y_angle;    /* grid rotation angle for Yellow */
extern float    Y_real_angle;  /* implemented rotation angle */
extern int      K_w;        /* Blalck fill pattern pixrect size */
extern int      K_h;
extern int      K_xmargin;
extern int      K_ymargin;
extern float    K_generation;  /* Black generation fraction */
extern float    K_threshold;   /* Black generation threshold */
extern float    K_angle;    /* grid rotation angle for Black */
extern float    K_real_angle;  /* implemented rotation angle */
extern float    UCR;        /* undercolor removal fraction */
extern int      CMYK;       /* flag to use BLACK ink */
extern int      Suppress_C; /* flag to supress CYAN ink printing */
extern int      Suppress_M; /* flag to supress MAGENTA ink printing */
extern int      Suppress_Y; /* flag to supress YELLOW ink printing */
extern int      Suppress_K; /* flag to supress BLACK ink printing */ extern int      Torpey_method;  /* flag for Torpey method of spot
functions */
```

INIT.C;1

```
/*
 * CTP Halftoning demo.
 *
 * Chris Duffy
 *
 * Initialization functions.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */ include <stdio.h>
include "newtypes.h"
#include "halftone.h"

/*
 * Static global spot definitions
 */
static short C_spot[] = {
#include "C_spot.h"
};
static short M_spot[] = {
#include "M_spot.h"
};
static short Y_spot[] = {
#include "Y_spot.h"
};

/*
 * Forward functions
 */
struct point            *point();
struct path             *path();
static void             no_memory_error();
```

```c
/*
 * external Global references
 */ int             C_row_shift[32];
    unsigned long   C_pattern[32];
    int             M_row_shift[32];
    unsigned long   M_pattern[32];
    int             Y_row_shift[32];
    unsigned long   Y_pattern[32];

extern unsigned long cyan_plane[];
    extern unsigned long magenta_plane[];
    extern unsigned long yellow_plane[];
    extern char          *outfname;
    extern int      Suppress_C;
    extern int      Suppress_M;
    extern int      Suppress_Y;
    extern int      Suppress_K;
    extern int      verbose;

extern struct grid  *rotated_grid();

/*
 * Globals
 */ int     Values = 32;         /* default num of intensity values */
float   Resolution = 300.0;  /* default dots / inch */
float   Dot_to_dot_dist = 5.5;   /* default on center distance */
int     Line_resolution = 54;  /* 54 default Resolution/dot_to_dot */
int     Max_X_used = 0;      /* extent of image plane used in X */
int     Max_Y_used = 0;      /* extent of image plane used in Y */
int     Spot_w = SPOT_W,
        Spot_h = SPOT_H,
        Spot_cx= 4,          /* x offset to center of spot */
        Spot_cy=4;           /* y offset to center of spot */
int     C_w;                 /* Cyan fill pattern pixrect size */
int     C_h;
int     C_xmargin;
int     C_ymargin;
float       C_value     = 0.0;      /* default Cyan value */
float   C_angle      = 54.0;    /* default Cyan pattern rotation */
float   C_real_angle = 54.0;    /* default  an pattern rotation */
int     M_w;                 /* Magenta fill patte:.. pixrect size */
int     M_h;
int     M_xmargin;
int     M_ymargin;
float       M_value     = 0.0;      /* default Magenta value */
float   M_angle      = 12.0;    /* default Magenta pattern rotation */
float   M_real_angle = 12.0;    /* default Cyan pattern rotation */
int     Y_w;                 /* Yellow fill pattern pixrect size */
int     Y_h;
int     Y_xmargin;
int     Y_ymargin;
float   Y_value      = 0.0;     /*  default Yellow value */
float   Y_angle      = -12.0;  /*  default Yellow pattern rotation */
```

```c
float   Y_real_angle = -12.0; /*  default Yellow pattern rotation */
int     K_w;            /* Black fill pattern pixrect size */
int     K_h;
int     K_xmargin;
int     K_ymargin;
float   K_generation =  1.0; /* default Black generation fraction */
float   K_threshold  =  0.0; /*  minimal value where Black begins */
float   K_angle      = 31.0;  /*  default Black pattern rotation */
float   K_real_angle = 31.0;  /*  default Black pattern rotation */
float   UCR = 0.00;    /*  default undercolor removal fraction */
int     CMYK = 0;      /*  flag to use BLACK ink */ int     Torpey_method = 0; /* flag for using Torpey method */
int     Xperiment = 0;       /* flag for experimental code  */ int        pattern_table[100][100];
int        start_pattern[32];

/*
 * The maximum size image for Color Thermal Printer is
 *       pmax_window = { 3008 , 4500 };
 */

/*
 * The file for writing.
 */ static FILE            *outfile = stdout;

/*
 * Forward Functions.
 */ void       - spot_function();
void         plot_start();
void         plot_finish();
void         plot_write_plane();

/*
 * Control code sequences for the Colour Thermal Printer; centronics
mode
 * ================================================================
 */
/*
 * Sent once at the beginning.
 */ char ctp_text_init[] =
{
    ESC, 0x43,              /* Set Character Mode */
};
```

```c
char ctp_raster_init[] =
{
    ESC, 0x47,              /* Set Raster Mode */
};

/*
 * Sent before each line of raster data.
 */ char ctp_ras_line[] =
{
    ESC, 0x34,              /* Print command A */
    0, 0,                   /* Number of bytes per line */
    0x80 | 1,               /* Line advance, 1 line of raster. */
};

/*
 * Sent between the colour planes.
 */ char ctp_colour_end[] =
{
    ESC, 0x03,              /* Colour End */
};

/*
 * Sent at the end of the last colour plane.
 */ char ctp_feed[] =           /* Form Feed */
{
    ESC, 0x0c,
};

void
init_halftone()
{
    int  i, j, x, y;

struct grid    *grid;
    Line_resolution = (int) Resolution/Dot_to_dot_dist;

/* MAGENTA */
    grid = rotated_grid(((int)M_angle), Line_resolution);
    x = grid->width + 2*(grid->xmargin);
    y = grid->height + 2*(grid->ymargin);
    M_w = grid->width; M_h = grid->height; M_real_angle = grid->real_angle;
    M_xmargin = grid->xmargin;
    M_ymargin = grid->ymargin;
    if(verbose>=1){
        fprintf(stderr, "MAGENTA grid: w= %d h= %d\n", M_w, M_h);
        fprintf(stderr, "MAGENTA real angle = %f\n", M_real_angle);
    }
    spot_function(grid->centers, MAGENTA );
    find_pattern(MAGENTA);
```

```c
        for(i=0;i<100;i++)
           for(j=0;j<100;j++)
              pattern_table[i][j] = 0;

/* CYAN */
    grid = rotated_grid(((int)C_angle), Line_resolution);
    x = grid->width + 2*(grid->xmargin);
    y = grid->height + 2*(grid->ymargin);
    C_w = grid->width; C_h = grid->height; C_real_angle =
grid->real_angle;
    C_xmargin = grid->xmargin;
    C_ymargin = grid->ymargin;
    if(verbose>=1){
        fprintf(stderr, "CYAN    grid: w= %d h= %d\n", C_w, C_h);
        fprintf(stderr, "CYAN    real angle = %f\n", C_real_angle);
    }
    spot_function(grid->centers, CYAN );
    find_pattern(CYAN);

for(i=0;i<100;i++)
       for(j=0;j<100;j++)
          pattern_table[i][j] = 0;

/* YELLOW */
    grid = rotated_grid(((int)Y_angle), Line_resolution);
    x = grid->width + 2*(grid->xmargin);
    y = grid->height + 2*(grid->ymargin);
    Y_w = grid->width; Y_h = grid->height; Y_real_angle =
grid->real_angle;
    Y_xmargin = grid->xmargin;
    Y_ymargin = grid->ymargin;
    if(verbose>=1){
        fprintf(stderr, "YELLOW grid: w= %d h= %d\n", Y_w, Y_h);
        fprintf(stderr, "YELLOW real angle = %f\n", Y_real_angle);
    }
    spot_function(grid->centers, YELLOW );
    find_pattern(YELLOW);

} /* end routine init_halftone */ void
spot_function(path, color)
struct path    *path;
int    color;
{
    int         x,y, dx,dy, cnt, cnt2, temp;
    short       *dot, *start, intensity;
    struct point *point;

if (path == NILPATH) return;

switch (color) {
    case CYAN: start = &C_spot[0];
            break;
    case MAGENTA: start = &M_spot[0];
            break;
```

```
    case YELLOW: start = &Y_spot[0];
            break;
    default: return;
            break;
    };

cnt = cnt2 = 0;
    while (path != NILPATH) {
        point = path->point;
        if (point == NILPOINT) break;
        x = point->x   ;
        y = point->y   ;
        cnt++;
        dot = start;
        intensity = *dot;
        while (*dot++ ) {
         cnt2++;
         dx = *dot++;
         dy = *dot++;
         temp = pattern_table[(y+dy)][(x+dx)];
         if( temp == 0)
                 pattern_table[(y+dy)][(x+dx)] = intensity;
         else {
                 if (temp > intensity)
                         pattern_table[(y+dy)][(x+dx)] = intensity;
                 else;
         }
         intensity = *dot;
        }
        path = path->next;
    }/* end of all points in path */
} /* end routine spot_function */ int
find_pattern(color)
int color;
{
    unsigned long mask, pattern;
    unsigned long row_shift[32], bit_pattern[32];
    int       width, height, xmargin, ymargin;
    int x, y, i, j, k, found, temp, r_edge, b_edge;

switch(color){
    case CYAN:
        xmargin = C_xmargin;
        ymargin = C_ymargin;
        width   = C_w;
        height  = C_h;
        break;
    case MAGENTA:
      . xmargin = M_xmargin;
        ymargin = M_ymargin;
        width   = M_w;
        height  = M_h;
        break;
    case YELLOW:
        xmargin = Y_xmargin;
        ymargin = Y_ymargin;
        width   = Y_w;
```

```
            height = Y_h;
            break;
    default:
            break;
    };

x = xmargin;
    y = ymargin;
    r_edge = xmargin + width;
    for (i=0; i<32; i++) {
        temp = pattern_table[y][x];
        if (temp ==1) {
            for(j=0; j<32; j++){
            start_pattern[j] = pattern_table[y][x];
            x++;
            if(x >= r_edge)
                x = xmargin;
            }
            break;
        }
        y++;
    }

SHIFT_VALUES:
    x = xmargin;  y = ymargin;
    b_edge = ymargin + height;
    j = 0;
    for(y=ymargin; y<b_edge; y++) {
        for(x=xmargin; x<r_edge; x++) {
            if(pattern_table[y][x] == 1){
              row_shift[j++] = width - (x-xmargin);
              break;
            }
        }
    }
    for(i=width; i<32; i++)
        row_shift[i] = row_shift[(i-width)];

pattern = 0;
    k = 1;
    for(i=1; i<32; i++) {
       found = FALSE;
       mask = 0x80000000;
       for(j=0; j<32; j++){
          if(start_pattern[j] == i){
             found = TRUE;
             pattern += mask;
             bit_pattern[k] = pattern;
          }
          mask = mask>>1;
       }
       if(found)
           k++;
    } switch(color){
    case CYAN:
        for(i=1; i<k; i++){
            C_pattern[i] = bit_pattern[i];
```

```
                C_row_shift[i] = row_shift[i];
            }
            break;
        case MAGENTA:
            for(i=1; i<k; i++){
                M_pattern[i] = bit_pattern[i];
                M_row_shift[i] = row_shift[i];
            }
            break;
        case YELLOW:
            for(i=1; i<k; i++){
                Y_pattern[i] = bit_pattern[i];
                Y_row_shift[i] = row_shift[i];
            }
            break;
        default:
            break;
    };

}/* end routine find pattern */

/*
 * point:
 *    Makes a point structure from two integers.
 */ struct point *
point(x, y)
int x, y;
{
    static struct point *free_points = NILPOINT;
    static int npoints = 0;
    static int points_mem = 0;
    register struct point *p;

/*
     * Allocate a new block of points.
     */
    if(npoints <= 0)
    {
        free_points = (struct point *)
          calloc(NPOINTS, sizeof(struct point));
        if(free_points == NILPOINT)
        {
            no_memory_error("points");
            return NILPOINT;
        } npoints = NPOINTS;
        points_mem += NPOINTS * sizeof(struct point);
    }

/*
     * Get a point for use.
     */
    p = free_points++;
    --npoints;
```

```
    /*
     * Fill in point.
     */
    p->x = x;
    p->y = y;

return p;

} /* end routine point */

/*
 * path:
 *    Links a new point to the current path of points.
 */ struct path *
path(path, point)
struct path *path;
struct point *point;
{
    static struct path *free_paths = NILPATH;
    static int npaths = 0;
    static int paths_mem = 0;
    register struct path *p, *q;

/*
     * Allocate a new block of paths.
     */
    if(npaths <= 0)
    {
        free_paths = (struct path *)
          calloc(NPATHS, sizeof(struct path));
        if(free_paths == NILPATH)
        {
            no_memory_error("paths");
            return NILPATH;
        } npaths = NPATHS;
        paths_mem += NPATHS * sizeof(struct path);
    }

/*
     * Get a path for use.
     */
    p = free_paths++;
    --npaths;

/*
     * Link new point to the path.
     */
    p->point = point;

/*
     * If this is the first element in the path, return it.
     */
```

```c
        if(path == NILPATH)
                return p;

/*
         * Find the end of the path,
         * and add the new element.
         */
        for(q = path; q->next != NILPATH; q = q->next)
                ;
        q->next = p;

return path;

} /* end routine path */ static void
no_memory_error(type)
char *type;
{
        static int memory_error = 0;

if(memory_error == 0)
                fprintf(stderr, "No memory for new %s\n", type);

memory_error++;
}/* end routine no_memory_error */ void
plot_start()
{

/*
     * Open the file.
     */
    if(outfname != NILSTRING && strcmp(outfname, "-") != 0)
    {
            if((outfile = fopen(outfname, "w")) == NIL)
                    prexit("Cant open %s\n", outfname);
    }

} /* end routine plot_start */ void
plot_finish()
{
    int  c, i;
    char *s;

/*
     * Write the text initialisation,
     * output 3 lines of test parameter information.
     */
    if(fwrite(&ctp_text_init[0], sizeof(ctp_text_init), 1,
outfile) == 0)
```

```c
        prexit("Write error: aborting\n");

/*
     * Write the raster data initialisation
     */
    if(fwrite(&ctp_raster_init[0], sizeof(ctp_raster_init), 1,
outfile) == 0)
        prexit("Write error: aborting\n");

/*
     * Write the yellow plane
     */
    if(Suppress_Y == FALSE)
      plot_write_plane(YELLOW);

/*
     * Feed to the new colour
     */
    if(fwrite(&ctp_colour_end[0], sizeof(ctp_colour_end), 1,
outfile) == 0)
        prexit("Write error: aborting\n");

if(fwrite(&ctp_text_init[0], sizeof(ctp_text_init), 1,
outfile) == 0)
        prexit("Write error: aborting\n");

/*
     * Write the magenta plane
     */
    if(fwrite(&ctp_raster_init[0], sizeof(ctp_raster_init), 1,
outfile) == 0)
        prexit("Write error: aborting\n");
    if(Suppress_M == FALSE)
      plot_write_plane(MAGENTA);

/*
     * Feed to the new colour
     */
    if(fwrite(&ctp_colour_end[0], sizeof(ctp_colour_end), 1,
outfile) == 0)
        prexit("Write error: aborting\n");

if(fwrite(&ctp_text_init[0], sizeof(ctp_text_init), 1,
outfile) == 0)
        prexit("Write error: aborting\n");

/*
     * Write the cyan plane
     */
    if(fwrite(&ctp_raster_init[0], sizeof(ctp_raster_init), 1,
outfile) == 0)
        prexit("Write error: aborting\n");
```

```
        if(Suppress_C == FALSE)
        plot_write_plane(CYAN);

if( CMYK == FALSE) goto plot_done;

/*
         * Feed to the new colour
         */
        if(fwrite(&ctp_colour_end[0], sizeof(ctp_colour_end), 1,
outfile) == 0)
            prexit("Write error: aborting\n");

if(fwrite(&ctp_text_init[0], sizeof(ctp_text_init), 1,
outfile) == 0)
            prexit("Write error: aborting\n");

/*
         * Write the black plane
         */
        if(fwrite(&ctp_raster_init[0], sizeof(ctp_raster_init), 1,
outfile) == 0)
            prexit("Write error: aborting\n");
        if(Suppress_K == FALSE)
        plot_write_plane(BLACK);

plot_done:

/*
         * Throw to the next sheet
         */
        if(fwrite(&ctp_feed[0], sizeof(ctp_feed), 1, outfile) == 0)
            prexit("Write error: aborting\n");

/*
         * Close the file.
         */
        if(outfile != stdout)
            fclose(outfile);

} /* end routine plot_finish */ void
close_session()
{
    int i;
    i = 0;

} /* end routine close_session */ static void
plot_write_plane(plane)
int plane;
{
```

```c
    int w, h;
    int x, y;
    int linebytes;
    int bytes;
    int words, line_longwords;
    /* char *data;   */
    /* register char *p; */
    unsigned long *p, *data;

w = Max_X_used; /* test 14 Apr 88, try to reduce output
      size */
    h = Max_Y_used; /* test 14 Apr 88, try to reduce output
      size */
    /* linebytes = 94*4;   /* pitch = 94 long words (=4bytes) */
    bytes = (w + 7) / 8;
    line_longwords = 94;
    words = (w + 31) / 32;
    switch (plane) {
       case CYAN:
          /* data = (char *) &cyan_plane[0]; */
          data = &cyan_plane[0];
          break;
       case MAGENTA:
          /* data = (char *) &magenta_plane[0]; */
          data =  &magenta_plane[0];
          break;
       case YELLOW:
          /* data = (char *) &yellow_plane[0]; */
          data =  &yellow_plane[0];
          break;
       default:
          break;
    } ctp_ras_line[2] = bytes >> 8;
    ctp_ras_line[3] = bytes & 0xff;

/*
     * Scan the lines of the pixrect.
     */
    p = data;
    for(y = 0; y < h; y++)
    { if(fwrite(&ctp_ras_line[0], sizeof(ctp_ras_line), 1,
outfile)
           == 0 ||
          /* fwrite(p, sizeof(char), bytes, outfile) == 0) */
           fwrite(p, sizeof(long), words, outfile) == 0)
               prexit("Write error: aborting\n");

/* p += linebytes;   6 oct 88 */
        p += line_longwords;
    }
}/* end routine plot_write_plane */
```

LAYOUT.C;1

```
/*
 * CTP Halftoning demo.  *
 * Chris Duffy
 *
 * layout functions.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */

/*
 *  Four-Color conversion model.
 *  given that:
 *     - minimum is a function to find the  minimum of three
parameters;
 *     - maximum is a function to find the  maximum of two parameters;
 *     - UCR is undercolor removal fraction; default 0.0.
 *     - K_threshold is the threshold value at which black generation
 *       begins;  it must be in the range 0 to 1.0, default 0.0.
 *     - K_generation is the function to determine how much black to
 *       generate for a given set of C,M,Y values.  It is generally
 *       equal to the minimum of C,M,Y.  It returns a value from 0.0 to
 *       1.0; our function does a simple multiply, it's default is 1.0.
 *     - Values is the number of intensity levels we can generate for a
 *       color.
 *     - C_value, M_value, Y_value are the requested intensity
 *       levels for cyan, magenta, and yellow respectively.  These
 *       values must be in the range of 0 to 1.0, where 1.0 is full
 *       color saturation.  Input processing should do the bound
checking.
 *     - Resulting Cyan_intensity (& magenta & yellow) MUST END UP
 *       IN THE RANGE OF [0 to Values].
 *
 * The black_intensity is added linearly from K_threshold to 1.0;
 * If K_threshold is 0.65, then when the minimum of (C,M,Y) is
 * greater than 0.65, black will be added in a linear fashion.  If
 * minimum is 0.68 a one pixel black spot will be added.  If minimum
 * is 0.99 a full black spot will be added.  The amount of undercolor
 * removed is dependent upon the value of UCR (see below).
 *
 * UCR (undercolor removal) determines how much of the undercolors
 * are removed.  Zero removes none of the colors, +1.0 removes the
 * minimum of (C,M,Y) from C, M, and Y; -1.0 adds the minimum of
(C,M,Y)
 * to C, M, and Y (any value over 1.0 is truncated to 1.0).
 * Because there may be a black threshold value, our undercolor
removal
 * function first determines how much black is going to be added (by
 * calling the Black_generation function) then multiplying this value
 * by the value of UCR.

* The basic four-color formula used herein is:
 *      min = minimum(C_value, M_value, Y_value);
 *      undercolor = (Black_generation(min) * UCR);
 *   Black_generation   = ((min - K_threshold)/(1 - K_threshold))
 *                       * K_generation ;
 *   black_intensity    = Black_generation * Values;
 *      Cyan_intensity    = maximum(0,(C_value - undercolor)) *
```

```
Values;
 *       Magenta_intensity = maximum(0,(M_value - undercolor)) *
Values;
 *       Yellow_intensity  = maximum(0,(Y_value - undercolor)) *
Values;
 *       }
 */ include "halftone.h"
include "newtypes.h"
#include "init.h"

#define PIX_SRC         0x18
#define PIX_DST         0x14
define OR              0x1c extern void pattern_fill();

/*
 * Forward functions.
 */ static void             fill_box();
static void             test_1();

void
layout (test)
int test;
{ switch (test) {
        case 1:
            test_1();
            break;
        default:
            break;
        } /* end switch */

} /* end routine layout */ static void
test_1 ()
{
    int i, j, box_width;
    int x, y, dx, dy, value, color;

/* set up sizes:
     * the left margin is 100, right margin is 2200
     * The number of vertical strips = Values, which is the
     * number of intensities we have for each color.
```

```
 */
value     = 0;
box_width = 2100/Values;
dx     = box_width;
dy     = 300;
x = 100;
y = 10;

/*
 * First fill Cyan, Magenta, and Yellow boxes with
 * their full ranges of color values.
 */
color = CYAN;
for (i=0; i<Values; i++) {
    fill_box(x, y, dx, dy, color, value);
    x+= box_width;
    value++;
}
x = 100;
y += 325;
value = 0;
color = MAGENTA;
for (i=0; i<Values; i++) {
    fill_box(x, y, dx, dy, color, value);
    x+= box_width;
    value++;
}
x = 100;
y += 325;
value = 0;
color = YELLOW;
for (i=0; i<Values; i++) {
    fill_box(x, y, dx, dy, color, value);
    x+= box_width;
    value++;
}
x = 100;
y += 325;
value = 0;
color = RED;
for (i=0; i<Values; i++) {
    fill_box(x, y, dx, dy, color, value);
    x+= box_width;
    value++;
}
x = 100;
y += 325;
value = 0;
color = GREEN;
for (i=0; i<Values; i++) {
    fill_box(x, y, dx, dy, color, value);
    x+= box_width;
    value++;
}
x = 100;
y += 325;
value = 0;
color = BLUE;
for (i=0; i<Values; i++) {
    fill_box(x, y, dx, dy, color, value);
    x+= box_width;
    value++;
}
```

```c
}/* end routine test_1() */ static void
fill_box (x, y, dx, dy, color, value)
int  x, y, dx, dy, color, value;
{ int xo, yo;

if ((x+dx) > Max_X_used)
        Max_X_used = x + dx;
    if ((y+dy) > Max_Y_used)
        Max_Y_used = y + dy;

if ((color & CYAN) == CYAN) {
        pattern_fill(CYAN, value, x, y, dx, dy, PIX_SRC);
    }
    if ((color & MAGENTA) == MAGENTA) {
        pattern_fill(MAGENTA, value, x, y, dx, dy, PIX_SRC);
    }
    if ((color & YELLOW) == YELLOW) {
        pattern_fill(YELLOW, value, x, y, dx, dy, PIX_SRC);
    }
    if ((color & BLACK) == BLACK) {
        xo = x ;
        yo = y ;
    }
} /* end routine fill_box */
```

LIB.C;1

```c
/*
 * CTP Halftoning demo.
 *
 * Chris Duffy
 *
 * Experimental Memory and Bitblt routines.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */

/* #include "halftone.h" */
/* #include "init.h" */ define CYAN                    0x08
define MAGENTA                 0x04
#define YELLOW                  0x02
define BLACK                   0x01 define RED                     (MAGENTA | YELLOW)
define GREEN                   (CYAN | YELLOW)
#define BLUE                    (CYAN | MAGENTA)

#define PIX_SRC         0x18
#define PIX_DST         0x14
define OR              0x1c
```

```c
unsigned long  C_pattern[32] = { 0x00000000,
        0x80000040, 0x81000040, 0xc1000060, 0xc10000e0, 0xc10020e0,
        0xc10060e0, 0xc10070e0, 0xc30070e0, 0xc38070e1, 0xc3c070e1,
        0xc3c870e1, 0xc3cc70e1, 0xc3ccf0e1, 0xc3cdf0e1, 0xc3ddf0e1,
        0xe3ddf0f1, 0xe3dff0f1, 0xe3fff0f1, 0xe3fff1f1, 0xe7fff1f3,
        0xe7fff9f3, 0xe7fffdf3, 0xe7fffff3, 0xe7fffffb, 0xffffffff,
        0xffffffff, 0xffffffff, 0xffffffff, 0xffffffff, 0xffffffff,
        0xffffffff};
unsigned long  M_pattern[32] = { 0x00000000,
        0x80000020, 0x82000020, 0xc2000030, 0xc6000031, 0xc6000431,
        0xc6200431, 0xc7200431, 0xc7200631, 0xc7300631, 0xe7300639,
        0xef30063b, 0xef30067b, 0xef38067b, 0xef78067b, 0xef78077b,
        0xef780f7b, 0xff780f7f, 0xfff80f7f, 0xfff88f7f, 0xfff88fff,
        0xfff8cfff, 0xfff9cfff, 0xfff9dfff, 0xfffbdfff, 0xffffffff,
        0xffffffff, 0xffffffff, 0xffffffff, 0xffffffff, 0xffffffff,
        0xffffffff};
unsigned long  Y_pattern[32] = { 0x00000000,
        0x80000020, 0x80000220, 0xc0000230, 0xc0000330, 0xc4000331,
        0xc4008331, 0xc4008731, 0xc6008731, 0xc600c731, 0xe600c739,
        0xe600cf39, 0xe600cf79, 0xe600ef79, 0xe601ef79, 0xe701ef79,
        0xef01ef7b, 0xff01ef7f, 0xff01efff, 0xff21efff, 0xff21ffff,
        0xff31ffff, 0xff39ffff, 0xff3dffff, 0xffbdffff, 0xffffffff,
        0xffffffff, 0xffffffff, 0xffffffff, 0xffffffff, 0xffffffff,
        0xffffffff};
int     C_row_shift[32] = {
        15, 22, 04, 11, 18, 00, 07, 14,
        21, 03, 10, 17, 24, 06, 13, 20,
        02, 09, 16, 23, 05, 12, 19, 01,
        08, 15, 22, 04, 11, 18, 00, 07 };
int     M_row_shift[32] = {
        04, 09, 14, 19, 24, 03, 08, 13,
        18, 23, 02, 07, 12, 17, 22, 01,
        06, 11, 16, 21, 00, 05, 10, 15,
        20, 25, 04, 09, 14, 19, 24, 03 };
int     Y_row_shift[32] = {
        12, 07, 02, 23, 18, 13, 08, 03,
        24, 19, 14, 09, 04, 25, 20, 15,
        10, 05, 00, 21, 16, 11, 06, 01,
        22, 17, 12, 07, 02, 23, 18, 13 };
int     C_column_shift[32] = {
        00, 07, 14, 21, 03, 10, 17, 24,
        06, 13, 20, 02, 09, 16, 23, 05,
        12, 19, 01, 08, 15, 22, 04, 11,
        18, 00, 07, 14, 21, 03, 10, 17 };
int     MY_column_shift[32] = {
        00, 06, 12, 18, 24, 04, 10, 16,
        22, 02, 08, 14, 20, 00, 06, 12,
        18, 24, 04, 10, 16, 22, 02, 08,
        14, 20, 00, 06, 12, 18, 24, 04 };
unsigned long  width_mask_32[33] = { 0x00000000,
        0x80000000, 0xc0000000, 0xe0000000, 0xf0000000,
        0xf8000000, 0xfc000000, 0xfe000000, 0xff000000,
        0xff800000, 0xffc00000, 0xffe00000, 0xfff00000,
        0xfff80000, 0xfffc0000, 0xfffe0000, 0xffff0000,
        0xffff8000, 0xffffc000, 0xffffe000, 0xfffff000,
        0xfffff800, 0xfffffc00, 0xfffffe00, 0xffffff00,
        0xffffff80, 0xffffffc0, 0xffffffe0, 0xfffffff0,
        0xfffffff8, 0xfffffffc, 0xfffffffe, 0xffffffff };
int pitch  = 94;
int C_pattern_width = 25;
int M_pattern_width = 26;
int Y_pattern_width = 26;
int C_first_shift = 15;
```

```
int M_first_shift =  4;
int Y_first_shift = 12;
int C_incr =  7;
int M_incr =  5;
int Y_incr = -5;
#define CMYK_MAX    2050
#define CMY_MAX     3005
/* if we are only using CMY ink in the printer, then
 * plane size is CMY_MAX * 94.
 */
#define PLANE_SIZE  (CMYK_MAX * 94)
unsigned long cyan_plane[PLANE_SIZE];
unsigned long magenta_plane[PLANE_SIZE];
unsigned long yellow_plane[PLANE_SIZE];

void
pattern_fill(color, intensity, x, y, width, height, op)
int color, intensity, x, y, width, height, op;
{ unsigned long  Src, *dst, pattern,
                    left_mask, mask;
        int         sh_l, incr, tile_width,
                    offset, bits_left,
                    rotate_l, rotate_r;
        unsigned long  temp;

if (intensity >31)
             intensity = 31;
        if (color == CYAN)     {
            tile_width = C_pattern_width;
            Src = C_pattern[intensity];
            /* We have to adjust the Src pattern for the x offset:
             * how many full words (modulo 32) is x from
             * the start of the pattern?  answer = ((x>>5) & 0x1f)
             */
            sh_l = C_column_shift[((x>>5) & 0x1f)];
            temp =  (Src << sh_l);
            temp |= (Src >> (tile_width - sh_l));
            Src = temp;
            dst = &cyan_plane[0];
            sh_l = C_row_shift[(y % C_pattern_width)];
            incr = C_incr; }
        else if (color == MAGENTA) {
            tile_width = M_pattern_width;
            Src = M_pattern[intensity];
            sh_l = MY_column_shift[((x>>5) & 0x1f)];
            temp =  (Src << sh_l);
            temp |= (Src >> (tile_width - sh_l));
            Src = temp;
            dst = &magenta_plane[0];
            sh_l = M_row_shift[(y % M_pattern_width)];
            incr = M_incr; }
        else if (color == YELLOW)   {
            tile_width = Y_pattern_width;
            Src = Y_pattern[intensity];
            sh_l = MY_column_shift[((x>>5) & 0x1f)];
            temp =  (Src << sh_l);
            temp |= (Src >> (tile_width - sh_l));
            Src = temp;
            dst = &yellow_plane[0];
            sh_l = Y_row_shift[(y % Y_pattern_width)];
```

```
            incr = Y_incr; }
/*************
else if (color == BLACK)   {
     Src = K_pattern[intensity];
     dst = &black_plane[0];
     tile_width = K_pattern_width;
     sh_l = K_first_shift;
     incr = K_incr; }
*************/

/* used in inner loop for wide fills */
rotate_l = 32 - tile_width;
rotate_r = (2*tile_width) - 32;

/* first get offset to starting corner */
offset = (x >> 5) + y*pitch;
dst += offset;
/* now set offset to equal what is necessary
 * to move to left edge (x) at next scan line.
 */
offset = pitch  - (width >>5) ;
if (width <32){
    offset--; /* because we do write at LEAST 1 word */
    left_mask = width_mask_32[width];
} else
    left_mask = width_mask_32[32];
left_mask = (left_mask >> (x & 0x1f));

while (height > 0) {
 pattern =  (Src << sh_l);
 pattern |= (Src >> (tile_width - sh_l));
 bits_left = (width - (32 - (x & 0x1f)));
 R_M_W(dst, pattern, left_mask, op);
 dst ++;

while (bits_left > 0) {
     temp =  (pattern << rotate_l);
     temp |= (pattern >> rotate_r);
     pattern = temp;
     if (bits_left <32) {
         mask = width_mask_32[bits_left];
         bits_left ^= bits_left; /* sets it to zero */
     } else {
         mask = width_mask_32[32];
         bits_left -= 32;
     }

R_M_W(dst, pattern, mask, op);
     dst++;
 }/*end one scan line */ height--;
 dst  += offset;
 sh_l += incr;
 if (sh_l >= tile_width)
      sh_l -= tile_width;
 else if (sh_l < 0)
      sh_l += tile_width;
 } /* end all scan lines */
} /* end routine pattern_fill */
```

```
R_M_W(dst, pattern, mask, op)
unsigned long *dst;
unsigned long pattern, mask;
int op;
{
    unsigned long temp;

temp = *dst;
    switch (op) {
    case OR:
        *dst = temp | pattern;
        break;
    case PIX_SRC:
        *dst = (temp & ~mask) + (pattern & mask);
        break;
    default:
        break;
    }

}
```

M_SPOT.H;1

```
/*
 * CTP Halftoning demo.
 *
 * Chris Duffy
 *
 * Initialization include file, defining the Magenta spot function.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */

/*
 * Compile-time definitions for halftone dot patterns.
 * The format is:
 *    i_value       dx    dy
 *    ...
 *    i_value       dx    dy
 *       0          00    00
 *
 * where i_value may or may not increase for each entry.  Thus
 * if two or more dots are to be placed for a given intensity
 * value, then the i_value would not increment at the next line.
 * The terminating entry is marked by an i_value of zero (0).
 *
 * The C code will appear as:
 *     static short M_spot[] ={
 *     #include "M_spot.h"
 *     };
 */
        1,    0,    0,
        2,    1,    1,
        3,    1,    0,
        4,    0,    1,
        5,    0,   -1,
```

```
 6,   0,   2,
 7,   2,   1,
 8,   1,  -1,
 9,   1,   2,
10,   2,   0,
11,  -1,   1,
12,  -1,   0,
13,   2,   2,
14,  -1,   2,
15,   2,  -1,
16,  -1,  -1,
17,   3,   0,
18,   3,   1,
19,   0,  -2,
20,  -2,   1,
21,  -2,   0,
22,   1,  -2,
23,   0,   3,
24,   1,   3,
25,   2,   3,
25,  -2,  -1,
26,   3,  -1,
26,  -1,   3,
27,   3,   2,
27,   3,   3,
27,  -1,  -2,
27,  -2,  -2,
28,   2,  -2,
28,   3,  -2,
28,  -2,   2,
28,  -2,   3,
 0,   0,   0
```

NEWMAIN.C;1

```
/*
 * Halftoning for the CTP Demo program
 *
 * Chris Duffy
 *
 * 14 Oct 88
 *
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */ include <stdio.h>
include <math.h>
#include "newtypes.h"
#include "halftone.h"

#define DESCSIZE    502
#define swabw(word)     ((((word) << 8) & 0xff00) + (((word) >> 8) & 0x00ff))
struct pp_head
{
    short   magic;                  /* magic number is 0xFEE5 */
    short   ncols;                  /* number of columns in picture */
```

```c
        short   nrows;              /* number of rows in picture */
        short   novers;             /* number of overlays per pixel */
        short   bytsiz;             /* the number of bits per pixel */
        char    descrip[DESCSIZE];  /* description of picture */
        } pp_hd ;

#define MAX_IMAGE_WIDTH   1280
#define MAX_IMAGE_HEIGHT  1280
#define MAX_SCREEN_WIDTH  1024
define MAX_SCREEN_HEIGHT 1024 extern double          atof();
extern int             atoi();
extern void            init_halftone();
extern void            process_image();
extern void            plot_start();
extern void            plot_finish();

void                   prexit();
bool                   prexit_abort = FALSE;
int                    verbose = 0;
float                  Max_intensity=255.0;
int                    image_width;
int                    image_height;
int                    screen_width;
int                    screen_height;
int                    Scale = 1;
int                    Suppress_C = FALSE;
int                    Suppress_M = FALSE;
int                    Suppress_Y = FALSE;
int                    Suppress_K = FALSE;

/*
 * File streams.
 */

FILE                   *FRAME_IN;
char                   *infname = NILSTRING;
char                   *outfname = NILSTRING;
char                   *data_file = NILSTRING;
char                   filename[80];
char    frame_name_R[80], frame_name_G[80], frame_name_B[80];

main(argc, argv)
int argc;
char *argv[];
{
    int i, j, defaults = TRUE;
    int ifi=0, ofi=0;

if(argc == 1)
    {
        argc = 2;
        argv[1] = "-?";     /* Was Nil */
    } j = 0;
    for(i = 1; i < argc; i++)
    {
```

```c
        if(argv[i][0] == '-')
        {
            switch(argv[i][1])
            {
            case '?':
            case 'H':
                fprintf(stderr,
"Usage: %s\n", argv[0]);
                fprintf(stderr,
"    [-v]                    # Verbose - summarise sizes\n");
                fprintf(stderr,
"    [-Ca <angle>]           # Cyan grid rotation angle (54.0 default)\n");
                fprintf(stderr,
"    [-Ma <angle>]           # Magenta grid rotation angle (12.0 default)\n");
                fprintf(stderr,
"    [-Ya <angle>]           # Yellow grid rotation angle (-12.0 default)\n");
                fprintf(stderr,
"    [-Ka <angle>]           # Black grid rotation angle (31.0 default)\n");
                fprintf(stderr,
"    [-Cv <C_value>]         # Cyan intensity value [0 to 1.0]\n");
                fprintf(stderr,
"    [-Mv <M_value>]         # Magenta intensity value [0 to 1.0]\n");
                fprintf(stderr,
"    [-Yv <Y_value>]         # Yellow intensity value [0 to 1.0]\n");
                fprintf(stderr,
"    [-K  ]                  # Use CMYK ink sheet \n");
                fprintf(stderr,
"    [-Kg <K_generation>]    # Black generation fraction (1.0 default)\n");
                fprintf(stderr,
"    [-Kt <K_threshold>]     # Black generation threshold (0.0 default)\n");
                fprintf(stderr,
"    [-Ku <UCR_fraction>]    # UnderColor Removal fraction (0.0 default) \n");
                fprintf(stderr,
"    [-D <dot_distance>]     # dot distance before rotation (5.5 default)\n");
                fprintf(stderr,
"    [-S <c,m,y, or k]       # suppress c, m, y, or black printing\n");
                exit(0);

case 'v':
                verbose++;
                break;
            case 'X':
                if(++i < argc)
                    Scale = atoi(argv[i]);
                break;
            case 'T':
                /* flag to use Torpey method */
                Torpey_method++;
                break;
            case 'D':
                if(++i < argc) {
                    Dot_to_dot_dist = atof(argv[i]);
                    defaults = FALSE;
                }
```

```
            break;
    case 'C':
            if(argv[i][2] == 'v')
            {
                    if(++i < argc){
                        C_value = atof(argv[i]);
                        if(C_value < 0.0)
                            C_value = 0.0;
                        if(C_value > 1.0)
                            C_value = 1.0;
                    }
            }
            else if(argv[i][2] == 'a')
            {
                    if(++i < argc){
                        C_angle = atof(argv[i]);
                        defaults = FALSE;
                    }
            }
            else
                    goto bad_flag;
            break;

case 'M':
            if(argv[i][2] == 'v')
            {
                    if(++i < argc){
                        M_value = atof(argv[i]);
                        if(M_value < 0.0)
                            M_value = 0.0;
                        if(M_value > 1.0)
                            M_value = 1.0;
                    }
            }
            else if(argv[i][2] == 'a')
            {
                    if(++i < argc){
                        M_angle = atof(argv[i]);
                        defaults = FALSE;
                    }
            }
            else
                    goto bad_flag;
            break;

case 'Y':
            if(argv[i][2] == 'v')
            {
                    if(++i < argc) {
                        Y_value = atof(argv[i]);
                        if(Y_value < 0.0)
                            Y_value = 0.0;
                        if(Y_value > 1.0)
                            Y_value = 1.0;
                    }
            }
            else if(argv[i][2] == 'a')
            {
                    if(++i < argc){
                        Y_angle = atof(argv[i]);
                        defaults = FALSE;
                    }
            }
```

```
                else
                    goto bad_flag;
                break;

case 'K':
            CMYK = TRUE;
            if(argv[i][2] == 'g')
            {
                if(++i < argc) {
                    K_generation = atof(argv[i]);
                    if(K_generation < 0.0)
                        K_generation = 0.0;
                    if(K_generation > 1.09)
                        K_generation = 1.00;
                }
            }
            else if (argv[i][2] == 't')
            {
                if(++i < argc)
                    K_threshold = atof(argv[i]);
                    if(K_threshold < 0.0)
                        K_threshold = 0.0;
                    if(K_threshold > 1.09)
                        K_threshold = 1.00;
            }
            else if (argv[i][2] == 'a')
            {
                if(++i < argc){
                    K_angle = atof(argv[i]);
                    defaults = FALSE;
                }
            }
            else if (argv[i][2] == 'u')
            {
                if(++i < argc){
                    UCR = atof(argv[i]);
                    if (UCR < -1.0)
                        UCR = -1.0;
                    if (UCR >  1.0)
                        UCR =  1.0;
                }
            }
            else ;
            break;

case 'S':
            if(argv[i][2] == 'c')
                Suppress_C = TRUE;
            else if (argv[i][2] == 'm')
                Suppress_M = TRUE;
            else if (argv[i][2] == 'y')
                Suppress_Y = TRUE;
            else if (argv[i][2] == 'k')
                Suppress_K = TRUE;
            else
                goto bad_flag;
            break;

default:
bad_flag:;
            prexit("Unrecognised flag %s\n", argv[i]);
```

```
            }
          }
        else
          {
          ifi = i;
          }
      } infname = argv[ifi];
    strncpy(frame_name_R, infname, 75); strcat(frame_name_R,
"_r.pp");
    strncpy(frame_name_G, infname, 75); strcat(frame_name_G,
"_g.pp");
    strncpy(frame_name_B, infname, 75); strcat(frame_name_B,
"_b.pp");

/*
     * We need to determine the size of the image before we can
     * initialize anything.  Thus find a file, get its size from
     * the header, then close it up.
     */
    data_file = &frame_name_R[0];
    if((FRAME_IN = fopen(data_file, "r"))!=NULL) {
        fread (&pp_hd, sizeof(struct pp_head), 1, FRAME_IN);
        if (pp_hd.magic == -283){   /* -283 = (short) 0xfee5 */
            image_height = screen_height = Max_Y_used =
pp_hd.nrows;
            image_width = screen_width = Max_X_used =
pp_hd.ncols;
        }else{
            image_height = screen_height = Max_Y_used =
swabw(pp_hd.nrows);
            image_width = screen_width = Max_X_used =
swabw(pp_hd.ncols);
        }
        fclose(FRAME_IN);
        goto Ready;
    }
    data_file = &frame_name_G[0];
    if((FRAME_IN = fopen(data_file, "r"))!=NULL) {
        fread (&pp_hd, sizeof(struct pp_head), 1, FRAME_IN);
        if (pp_hd.magic == -283){
            image_height = screen_height = Max_Y_used =
pp_hd.nrows;
            image_width = screen_width = Max_X_used =
pp_hd.ncols;
        }else{
            image_height = screen_height = Max_Y_used =
swabw(pp_hd.nrows);
            image_width = screen_width = Max_X_used =
swabw(pp_hd.ncols);
        }
        fclose(FRAME_IN);
        goto Ready;
    }
    data_file = &frame_name_B[0];
    if((FRAME_IN = fopen(data_file, "r"))!=NULL)  {
         fread (&pp_hd, sizeof(struct pp_head), 1, FRAME_IN);
        if (pp_hd.magic == -283){
            image_height = screen_height = Max_Y_used =
```

```
                    pp_hd.nrows;
                    image_width  = screen_width  = Max_X_used =
pp_hd.ncols;
            }else{
                    image_height = screen_height = Max_Y_used =
swabw(pp_hd.nrows);
                    image_width  = screen_width  = Max_X_used =
swabw(pp_hd.ncols);
            }
            fclose(FRAME_IN);
            goto Ready;
        } printf("Could not find any input files\n");
        exit(1);

Ready:
        if (image_height > MAX_IMAGE_HEIGHT) {
            printf("input file too high\n");
            exit(1);
        }
        if (image_width > MAX_IMAGE_WIDTH) {
            printf("input file too wide\n");
            exit(1);
        }
        if (screen_height > MAX_SCREEN_HEIGHT) {
            screen_height = MAX_SCREEN_HEIGHT;
        }
        if (screen_width > MAX_SCREEN_WIDTH) {
            screen_width = MAX_SCREEN_WIDTH;
        }

/*
 * End of command line option parsing.
 * Now initialize the halftone grids, etc.
 */ if (defaults == FALSE)
        init_halftone();

plot_start();
/*
 * End of initializing half tone grids.
 * Now generate image(s) for CTP.
 */

/*
         * Read the header of the data file (which contains LUT,
light
         * source data, screen size, etc).
         */
        data_file = &frame_name_R[0];
        if((FRAME_IN = fopen(data_file, "r"))!=NULL) {
            fread (&pp_hd, sizeof(struct pp_head), 1, FRAME_IN);
            process_image(RED,FRAME_IN);
            fclose(FRAME_IN);
        }
```

```
        data_file = &frame_name_G[0];
        if((FRAME_IN = fopen(data_file, "r"))!=NULL) {
            fread (&pp_hd, sizeof(struct pp_head), 1, FRAME_IN);
            process_image(GREEN,FRAME_IN);
            fclose(FRAME_IN);
            }
        data_file = &frame_name_B[0];
        if((FRAME_IN = fopen(data_file, "r"))!=NULL) {
            fread (&pp_hd, sizeof(struct pp_head), 1, FRAME_IN);
            process_image(BLUE,FRAME_IN);
            fclose(FRAME_IN);
            } plot_finish();

} /* END MAIN ROUTINE */

/*
 * Additional Standard Function Library.
 *
 * N. D. Hunt.
 *
 * Print and Exit function.
 *
 */ void
prexit(string, arg1, arg2, arg3, arg4, arg5, arg6, arg7, arg8)
{
    fprintf(stderr, string, arg1, arg2, arg3, arg4, arg5, arg6, arg7, arg8);

if(prexit_abort)
      abort();

exit(-1);
}

NEWPROCESS.C;1

/*
 * CTP Halftoning demo.  *
 * Chris Duffy
 *
 * layout functions.
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */ include <stdio.h>
```

```c
/* #include "../ctp/newtypes.h" */
/* #include "../ctp/halftone.h" */

/* the four color ink sheet is only about 2010 units in
 * length; the 3 color ink sheet can handle 17 inch length.
 */
#define CMYK_MAX     2050
define CMY_MAX              3005 define CYAN                            0x08
define MAGENTA                         0x04
#define YELLOW                          0x02
define BLACK                           0x01 define RED                             (MAGENTA | YELLOW)
define GREEN                           (CYAN | YELLOW)
#define BLUE                            (CYAN | MAGENTA)

#define PIX_SRC         0x18
#define PIX_DST         0x14
define OR              0x1c define MAX_IMAGE_WIDTH         1280
define MAX_IMAGE_HEIGHT 1280
extern int image_width;
extern int image_height;
extern int screen_width;
extern int screen_height;
extern int Scale;
extern int Values;
extern float Max_intensity;
extern int Max_X_used;
extern int Max_Y_used;
extern void pattern_fill();

unsigned char Cbuf[MAX_IMAGE_HEIGHT][MAX_IMAGE_WIDTH];

void
process_image (color, FRAME_IN)
int   color;
FILE *FRAME_IN;
{
    int    i, j, k ;
    int    x, y , xo, yo;
    int    ci, mi, yi;
    float  C, M, Y, intensity  ;

for (i=0; i<image_height; i++)
        fread(Cbuf[i], image_width, 1, FRAME_IN);

if((Scale*screen_width)>CMYK_MAX)
    Scale = CMYK_MAX/screen_width;
  if((Scale*screen_height)>CMYK_MAX)
    Scale = CMYK_MAX/screen_height;
  Max_X_used = Scale * screen_width;
  Max_Y_used = Scale * screen_height;
```

```c
    switch(color) {
    case RED:
      color = CYAN;
      /**********
        * test lines, use when we just want to generate a test
        * pattern.
          pattern_fill(color, 13, 0, 0, Max_X_used, Max_Y_used,
PIX_SRC);
          pattern_fill(color, 14, Max_X_used, 0,
             (2*Max_X_used), Max_Y_used, PIX_SRC);
      Max_X_used *=2;
      return;
      color = MAGENTA;
      for (i=0; i< 300; i+=2)
          for(j=0; j<100; j+=2)
              pattern_fill(color, 13, j, i, 2, 2, PIX_SRC);
      return;
      ***********/
      break;
    case GREEN:
      color = MAGENTA;
      break;
    case BLUE:
      color = YELLOW;
      break;
    default: break;
    }

/* Process the image */
    for (i=0; i<screen_height; i++) {

/* The orientation of the data should be:
        * top is left edge of paper;
        * left side of image is direction of paper movement.
        * Currently the data is inverted left-to-right,
        * thus we will just process from the other side.
        */
        k = (screen_height -1) - i;
        /* for each pixel in the scan line */
        for (j=0; j<screen_width;  j++) { x = i*Scale;
           y = j*Scale;
           intensity = (float) Cbuf[k][j];

if(intensity == 0.0)
           intensity = 0.0;
           C = 1.0 - (float) (intensity / Max_intensity);
           ci = (int) (C * Values);
             pattern_fill(color, ci, x, y, Scale, Scale, PIX_SRC);

} /* end for j=0 to screen_width */
      } /* end for i=0 to screen_height */
} /* end routine process_image */
```

NEWTYPES.H;1

```
/*
 * Chris Duffy
 *
 * Standard definitions of new types for C language extension.
 *
```

```
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */ define SUN3

/*
 * Some new types.
 * ===============
 *   Note that ushort is not defined if major is defined, as
 *      this means that sys/types has been included, which has already
 *      defined ushort.
 */ ifndef SUN3
define void          int
#endif SUN3
typedef   char        *cstring;
typedef int           bool;
typedef unsigned char    uchar;
#ifndef major
typedef unsigned int     uint;
typedef unsigned short   ushort;
endif major /*
 * Types for variables which point to functions.
 * =============================================
 */ typedef int           (*pfint)();
typedef void          (*pfvoid)();
typedef void          *(*pfpvoid)();
typedef cstring          (*pfcstring)();
typedef bool          (*pfbool)();

/*
 * Some predefined values.
 * =======================
 */

/*
 * NIL is to be used as a general nil pointer.
 * NILSTRING is an empty string pointer.
 */
#define NIL         0
#define NILSTRING   (cstring)0

/*
 * Word size limits.
 */
#define MAXINT       2147483647
#define NEGMAXINT    (-2147483648)
define UMAXINT          4294967295 define MAXSHORT     32767
define NEGMAXSHORT  (-32768)
#define UMAXSHORT    65535
```

```
#define MAXBYTE         127
#define NEGMAXBYTE      (-128)
#define UMAXBYTE        255

/*
 * TRUE and FALSE, unless they are already defined.
 * (If they are defined, then there may be conflicts in the value of TRUE -
 * always test against FALSE, use TRUE only as rvalue.)
 */
#ifndef TRUE
#define TRUE       1
#endif  TRUE
#ifndef FALSE
#define FALSE      0
endif  FALSE /*
 * Memory allocation.
 */
#define ZEROED     0
#define UNZEROED   1

/*
 * Some macros.
 * ===========
 */

/*
 * Max returns the maximum of x and y.
 */
#define Max(x, y)         (((x) > (y))? (x) : (y))

/*
 * Min returns the minimum of x and y.
 */
#define Min(x, y)         (((x) < (y))? (x) : (y))

/*
 * Range returns the value of x clipped to >= min and <= max.
 */
#define Range(min, x, max)   (((x) < (min))? \
                  (min) : (((x) > (max))? (max) : (x)) \
                 )

/*
 * Swab swaps bytes in an inefficient manner.
 */
#define Swab(x)              (((x >> 8) & 0x00ff) | ((x << 8) & 0xff00))

/*
 * Swaw swaps bytes in a longword in an inefficient manner.
 */
#define Swaw(x)              (((x >> 24) & 0x000000ff) | \
                  ((x >> 8)  & 0x0000ff00) | \
                  ((x << 8)  & 0x00ff0000) | \
                  ((x << 24) & 0xff000000) \
                 )

/*
 * Offset returns the number of bytes which when added to a pointer
 *   of type 'type' yield a pointer to a field 'field' in the
```

```
 *    structure of type 'type' pointed at by the pointer.
 */
#define Offset(type, field)    ((int)(&((type 0)->field)))

/*
 * Index adds the number of bytes 'offset' to the pointer 'ptr' giving
 *   a pointer to a field within a structure whose offset was derived
 *   using the Offset macro above. The value returned is (int) and
 *   must be cast into the correct pointer type.
 */
#define Index(ptr, offset)    ((int)(ptr) + (offset))

/*
 * ESC is the escape char.
 * DEL is the delete character.
 * Control returns the control character of the argument.
 */
#define ESC                '\033'
#define DEL                '\177'
#define Control(c)         ((c) - 0x40)

/*
 * Number returns the decimal value of the character c.
 */
#define Number(c)          ((c) - '0')

/*
 * Sign returns +1, 0 or -1;
 */
#define Sign(n)            (((n) == 0)? 0 : (((n) > 0)? 1 : -1 ))

/*
 * Abs returns |n|
 */
#define Abs(n)             (((n) >= 0)? (n) : (-n))

/*
 * Sqr returns the square of a number.
 */
#define Sqr(n)             ((n) * (n))

/*
 * Powers of two.
 */
#define Power_of_two(n)    (1 << (n))
```

ROTATEDGRID.C;1

```
/*
 * <rotatedgrid.c Version 1.2>
 * Chris Duffy, April 11th 1988
 * This procedure uses the Horizontal and Vertical Shifts
 * computed by angletoxy
 * to generate a list of points giving the centers of the rotated grid
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */
```

```c
#include <stdio.h>
include <math.h>
#include "newtypes.h"
#include "halftone.h"

extern struct point *point();
extern struct path  *path();

struct point        *periodicity();
bool                isinside();

struct point *
angletoxy (grid_angle, grid_resolution)
int grid_angle;
int grid_resolution;
{
        double ybyx, a;
        struct point    *p;
        struct point    pp;

if (grid_resolution == 0)
                prexit("Line Resolution cannot be 0\n");
        p = &pp;
        a = DEGTORAD;
        ybyx = tan (a * (double) grid_angle);
        a = (double) Resolution /
                ((double) (grid_resolution) * sqrt (1 + ybyx*ybyx));
        p->x = (int) (a + 0.5);
        if (ybyx >= 0 )
                {
                        p->y = (int)(a * ybyx + 0.5);
                }
                else /* angle is negative  */
                {
                        p->y = (int)(a * ybyx - 0.5);
                }
        return p;
} struct grid *
rotated_grid(grid_angle, grid_resolution)
int  grid_angle, grid_resolution;
{
        struct point        *newpoint, np, start;
        struct point        *unit_point, up;
        struct point        *period, per;
        struct path         *q;
        static struct path  qq;
        double              dx,dy,a;
        float               dottodot;
        double              sinalfa, cosalfa;
        int                 mtimes, ntimes;
        int                 txtimes, tytimes;
        int                 x, y;
        int                 i,j;
        struct grid         *grid;
        static struct grid  g;

grid = &g;
        q = NILPATH;

/*
 * Use angletoxy to compute the displacements
```

```c
 */
    unit_point = &up;
    *unit_point = *angletoxy(grid_angle, grid_resolution);
    dx = (double)unit_point->x;
    dy = (double)unit_point->y;
    /* Store derived results */
    a = DEGTORAD;
    grid->real_angle = (float)atan (dy/dx)/a;
    grid->real_resolution = (float) Resolution / sqrt (dx*dx +
dy*dy);

/*
 * Compute periodicity from x and y displacements
 */
    period = &per;
    *period = *periodicity(unit_point->x, unit_point->y);
    grid->width = period->x;
    grid->height = period->y;

/*
 * Compute margins
 */
    grid->xmargin = SPOT_W;
    grid->ymargin = SPOT_H;

/*
 * Generate the linked list of centers
 */ dottodot = (float)Resolution / grid->real_resolution;
    a = DEGTORAD;
    sinalfa = sin (a * (double)grid->real_angle);
    cosalfa = cos (a * (double)grid->real_angle);
    if (sinalfa >= 0)
           {      /* case angle is positive */
    /*
     * First, find the starting point (upper left corner)
     */
        mtimes = (int)((float)sinalfa
            * ((float)period->y + (float)grid->ymargin)
            / dottodot);
        ntimes = (int)((float)cosalfa
            * ((float)period->x + (float)grid->xmargin)
            / dottodot);
        txtimes = mtimes + ntimes + 1;
        start.x = - mtimes * (int)dx + grid->xmargin/2;
        start.y = mtimes * (int)dy + grid->ymargin/2;

mtimes = (int)((float)cosalfa
                    * ((float)period->y + (float)grid->ymargin)
                / dottodot);
             ntimes = (int)((float)sinalfa
                    * ((float)period->x + (float)grid->xmargin)
                / dottodot);
             tytimes = mtimes + ntimes + 1;

/*
     * Double Loop to generate the centers
     */
        for (j = 0;j < tytimes;j++)
               {
               for (i = 0;i < txtimes;i++)
                   {
```

```
                    x = start.x + i * unit_point->x
                            + j * unit_point->y;
                    y = start.y - i * unit_point->y
                            + j * unit_point->x;
                    if (isinside(x, y, grid))
                        {
                        newpoint = point (x, y);
                        qq = *path(q, newpoint);
                        q = &qq;
                        }
                    }
                }
            }
        else        /* case angle is negative */
            {
        /*
         * First, find the starting point (upper left corner)
         */ mtimes = (int)(- dottodot * sinalfa
                    * ((float)period->y + (float)grid->ymargin));
            ntimes = (int)(dottodot * cosalfa
                    * ((float)period->x + (float)grid->xmargin));
            txtimes = mtimes + ntimes +1;
            start.x = - mtimes * (int)dy;
            start.y = - mtimes * (int)dx;

mtimes = (int)(dottodot * cosalfa
                    * ((float)period->y + (float)grid->ymargin));
            ntimes = (int)(- dottodot * sinalfa
                    * ((float)period->x + (float)grid->xmargin));
            tytimes = mtimes + ntimes + 1;

/*
         * Double Loop to generate the centers
         */
            for (j = 0;j < tytimes;j++)
                {
                for (i = 0;i < txtimes;i++)
                    {
                    x = start.x + i * unit_point->x
                            + j * unit_point->y;
                    y = start.y - i * unit_point->y
                            + j * unit_point->x;
                    if (isinside(x, y, grid))
                        {
                        newpoint = point (x, y);
                    qq = *path(q, newpoint);
                    q = &qq;
                        }
                    }
                }
            }
    /*
     * Return grid structure
     */
    grid->centers = q;
    return grid;
} struct point *
periodicity(deltax, deltay)
int deltax, deltay;
```

```
{
    /*
     * Computes the periodicity at which the resulting pattern will
     * repeat itself
     */
    int n,p;
    int dx, dy, v, h;
    struct point *point;
    struct point pp;

dx = (deltax < 0)? -deltax : deltax;
    dy = (deltay < 0)? -deltay : deltay;
    point = &pp;
    v = (dx >= dy)? dy : dx;
    h = (dx >= dy)? dx : dy;
    if (v == 0)
        {
        point->x = h;
        point->y = h;
        return point;
        };

n = h/v;
    if ((h - n*v) == 0)
        {
        p = (n*n + 1)*v;
        }
        else
        {
        p = h*h + v*v;
        } point->x = p;
    point->y = p;
    return point;
} bool
isinside(xp, yp, grid)
int   xp, yp;
struct grid     *grid;
{
    bool isin = FALSE;
    if (xp < grid->xmargin/2)return isin;
    if (yp < grid->ymargin/2) return isin;
    if (xp > (grid->width + grid->xmargin + grid->xmargin/2))return
isin;
    if (yp > (grid->height + grid->ymargin + grid->ymargin/2))return
isin;

isin = TRUE;
    return isin;
}
```

Y_SPOT.H;1

```
/*
 * CTP Halftoning demo.
 *
 * Chris Duffy
 *
 * Initialization include file, defining the Yellow spot function.
```

```
 *
 * Copyright Oce Graphics USA Inc., 1989, 1990.
 * Copyright Schlumberger Technologies, 1988, 1989.
 * All or a portion of this program is subject to the restrictions
 * contained in a license granted by, and remains the unpublished
 * property of, Schlumberger Technologies.
 */

/*
 * Compile-time definitions for halftone dot patterns.
 * The format is:
 *    i_value          dx    dy
 *    ...
 *    i_value          dx    dy
 *       0             00    00
 *
 * where i_value may or may not increase for each entry.  Thus
 * if two or more dots are to be placed for a given intensity
 * value, then the i_value would not increment at the next line.
 * The terminating entry is marked by an i_value of zero (0).
 *
 * The C code will appear as:
 *      static short Y_spot[] ={
 *      #include "Y_spot.h"
 *      };
 */
    1,    0,    0,
    2,    1,    1,
    3,    1,    0,
    4,    0,    1,
    5,    0,   -1,
    6,    0,    2,
    7,    2,    1,
    8,    1,   -1,
    9,    1,    2,
   10,    2,    0,
   11,   -1,    1,
   12,   -1,    0,
   13,    2,    2,
   14,   -1,    2,
   15,    2,   -1,
   16,   -1,   -1,
   17,    3,    0,
   18,    3,    1,
   19,    0,   -2,
   20,   -2,    1,
   21,   -2,    0,
   22,    1,   -2,
   23,    0,    3,
   24,    1,    3,
   25,    2,    3,
   25,   -2,   -1,
   26,    3,   -1,
   26,   -1,    3,
   27,    3,    2,
   27,    3,    3,
   27,   -1,   -2,
   27,   -2,   -2,
   28,    2,   -2,
   28,    3,   -2,
   28,   -2,    2,
   28,   -2,    3,
    0,    0,    0
```

I claim:

1. A method of generating a digitally-simulated halftone screen for rendering of an image with a rendering device, said image being made up of a plurality of incremental regions having respective tonal intensities, comprising the steps of:
   a. determining tonal intensity of an incremental region of said image;
   b. selecting from a set of pattern headers a pattern header representative of said determined tonal intensity, each pattern header of said set comprising a sequence of halftone values;
   c. generating from said selected pattern header a halftone pattern segment corresponding to said determined tonal intensity and encompassing said incremental region, the halftone pattern segment comprising a sequence of halftone values;
   d. extracting from said halftone pattern segment a halftone value corresponding spatially to said incremental region;
   e. repeating steps a.–d. to extract a halftone value for each incremental region of said image; and
   f. arranging the extracted halftone values to produce a digitally-simulated halftone screen of said image.

2. The method of claim 1, further comprising the step of repeating steps a.–f. for each of a plurality of process colors, whereby a digitally-simulated halftone screen of said image is produced for each of said process colors.

3. The method of claim 1, wherein each said pattern header comprises an x-by-1 array of halftone values, where x is an integer power of two.

4. The method of claim 3, wherein each halftone value of said array comprises a single bit representing a binary intensity level, the method further comprising the step of driving a binary rendering device with the halftone values of said digitally-simulated halftone screen to produce a digitally-simulated halftone reproduction of said image.

5. The method of claim 3, wherein each halftone value of said array comprises a plurality of bits representing an intensity level, the method further comprising the step of driving a variable-dot-size rendering device with the halftone values of said digitally-simulated halftone screen to produce a digitally-simulated halftone reproduction of said image.

6. The method of claim 1, wherein for each said pattern header the sequence of halftone values defines a pattern header width and a halftone repeating pattern width, the halftone repeating pattern width being less than the pattern header width, and wherein step c. comprises the steps of:
   i. logically left-shifting the pattern header to produce a left-shifted pattern header portion;
   ii. logically right-shifting the pattern header to produce a right-shifted pattern header portion; and
   iii. logically ORing the left-shifted pattern header portion and the right-shifted pattern header portion to produce said halftone pattern segment.

7. The method of claim 6, further comprising the step of repeating steps a. through f. for each of a plurality of process colors, to thereby produce a digitally-simulated halftone screen of said image for each of said plurality of process colors.

8. The method of claim 1, wherein for each said pattern header the sequence of halftone values defines a pattern header width (W) and a halftone repeating pattern width (DIM), the halftone repeating pattern width (DIM) being less than the pattern header width (W), wherein each pattern header has an associated shift value (SV), and wherein step c. comprises the steps of:
   i. determining an x,y coordinate position of said incremental region within said image;
   ii. logically left-shifting the selected pattern header by a number of halftone values determined from the x,y coordinate position of said incremental region, from the pattern header width (W), from the halftone repeating pattern width (DIM) of the selected pattern header, and from the associated shift value (SV) of the selected pattern header, to thereby produce a left-shifted pattern;
   iii. logically right-shifting the selected pattern header by a number of halftone values determined from the x,y coordinate position of said incremental region, from the pattern header width (W), from the halftone repeating pattern width (DIM) of the selected pattern header, and from the associated shift value (SV) of the selected pattern header, to produce a right-shifted pattern; and
   iv. logically ORing the left-shifted pattern and the right-shifted pattern to produce said halftone pattern segment.

9. The method of claim 1, wherein for each said pattern header the sequence of halftone values defines a pattern header width (W) and a halftone repeating pattern width (DIM), the halftone repeating pattern width (DIM) being less than the pattern header width (W), wherein each pattern header has an associated shift value (SV), and wherein step c. comprises:
   i. determining an x,y coordinate position (X,Y) of said incremental region within said image;
   ii. determining a left-shift count ($SV_n$) from the relationship:

$$SV_n = (X + (Y*SV)) \text{ modulo } DIM$$

iii. determining a right-shift count from the relationship:

$$\text{right-shift count} = (DIM - SV_n) \text{ modulo } DIM$$

iv. logically left-shifting the selected pattern header by a number of halftone values equal to said left-shift count ($SV_n$) to thereby produce a left-shifted pattern;
   v. logically right-shifting the selected pattern header by a number of halftone values equal to said right-shift count to thereby produce a right-shifted pattern; and
   vi. logically ORing the left-shifted pattern and the right-shifted pattern to produce said halftone pattern segment.

10. The method of claim 1, wherein for each said pattern header the sequence of halftone values defines a pattern header width (W) and a halftone repeating pattern width (DIM), the halftone repeating pattern width (DIM) being less than the pattern header width (W), wherein each pattern header has an associated shift value (SV), and wherein step c. comprises:
    i. determining an x,y coordinate position (X,Y) of said incremental region within said image;
    ii. determining a left-shift count ($SV_n$) from the relationship:

$$SV_n = (X + (Y*SV)) \text{ modulo } DIM$$

iii. determining a right-shift count from the relationship:

right-shift count = $(DIM - SV_n)$ modulo DIM iv. storing a first copy of the selected pattern header in a first logical-shift register;
v. logically left-shifting the stored first copy of the selected pattern header by a number of halftone values equal to said left-shift count ($SV_n$) to thereby produce a left-shifted pattern;
vi. storing a copy of the selected pattern header in a second logical-shift register;
vii. logically right-shifting the stored second copy of the selected pattern header by a number of halftone values equal to said right-shift count to thereby produce a right-shifted pattern; and
viii. combining the left-shifted pattern and the right-shifted pattern in a logical OR operation to produce said halftone pattern segment.

11. Apparatus for generating a portion of a digitally-simulated halftone screen for rendering of an image with a rendering device, said image being made up of a plurality of incremental regions having respective tonal intensities, comprising:
   a. means (250) for providing to a first logical-shift means (252) and to a second logical-shift means (254) a pattern header (PH) representative of tonal intensity of an incremental region of said image, the pattern header comprising a sequence of halftone values;
   b. first logical-shift means (252) for logically left-shifting the pattern header by a first number of halftone values ($SV_n$) to produce a first halftone pattern segment comprising a sequence of halftone values, and for providing the first halftone pattern segment to a combining means (260);
   c. second logical-shift means (254) for logically right-shifting the pattern header by a second number of halftone values ($DIM - SV_n$) to produce a second halftone pattern segment comprising a sequence of halftone values, and for providing the second halftone pattern segment to said combining means (260); and
   d. combining means (260) for combining the first halftone pattern segment and the second halftone pattern segment in a logical OR operation to produce a portion of a digitally-simulated halftone screen.

12. The apparatus according to claim 11, wherein the incremental region is located at an x,y coordinate position (X,Y) within the image, wherein the pattern header comprises a sequence of halftone values defining a pattern header width (W) and a halftone repeating pattern width (DIM), the halftone repeating pattern width (DIM) being less than the pattern header width (W), and wherein the pattern header has an associated shift value (SV), the apparatus further comprising:
   e. means (256) for commanding the first logical-shift means (252) to logically left-shift the pattern header by a number of halftone values determined from the x,y coordinate position of said incremental region, from the pattern header width (W), from the halftone repeating pattern width (DIM) of the pattern header, and from the associated shift value (SV) of the pattern header; and
   f. means (258) for commanding the second logical-shift means (254) to logically right-shift the pattern header by a number of halftone values determined from the x,y coordinate position of said incremental region, from the pattern header width (W), from the halftone repeating pattern width (DIM) of the pattern header, and from the associated shift value (SV) of the pattern header.

13. The apparatus according to claim 11, wherein the incremental region is located at an x,y coordinate position (X,Y) within the image, wherein the pattern header comprises a sequence of halftone values defining a pattern header width (W) and a halftone repeating pattern width (DIM), the halftone repeating pattern width (DIM) being less than the pattern header width (W), and wherein the pattern header has an associated shift value (SV), the apparatus further comprising:
   e. means (256) for commanding the first logical-shift means (252) to logically left-shift the pattern header by a number of halftone values (SVn) equal to:

$(X + (Y*SV))$ modulo DIM; and f. means (258) for commanding the second logical-shift means (254) to logically right-shift the pattern header by a number of halftone values equal to:

$(DIM - SV_n)$ modulo DIM.

14. The apparatus according to claim 11, wherein said first logical-shift means (252) comprises a barrel-shifted logical-shift device and said second logical-shift means (254) comprises a barrel-shifted logical-shift device.

* * * * *